United States Patent [19]
Garber

[11] Patent Number: 5,605,091
[45] Date of Patent: Feb. 25, 1997

[54] SELF CONTAINED FRYING MACHINE

[75] Inventor: Jack C. Garber, Sherman Oaks, Calif.

[73] Assignee: Fry Factory, Inc., Studio City, Calif.

[21] Appl. No.: 336,292

[22] Filed: Nov. 8, 1994

Related U.S. Application Data

[63] Continuation-in-part of Ser. No. 150,853, Aug. 11, 1993, abandoned.
[51] Int. Cl.$^6$ ...................................................... A47J 37/12
[52] U.S. Cl. ................................ 99/330; 99/353; 99/356; 99/357; 99/404; 99/407
[58] Field of Search ............................ 99/352, 353, 356, 99/357, 355, 330, 516, 536, 443 C, 335, 403–410; 426/231, 509, 523

[56] References Cited

U.S. PATENT DOCUMENTS 4,540,588  9/1985  Bartfield .................................. 426/231
4,646,627  3/1987  Bartfield et al. ........................... 99/330

*Primary Examiner*—Timothy F. Simone
*Attorney, Agent, or Firm*—Poms, Smith, Lande & Rose

[57] ABSTRACT

A self contained frying machine having a storage area, a mixing chamber for receiving a pre-measured amount of dehydrated food product from the storage area and rehydrating and solidifying the same, a piston for compressing the rehydrated food product and forcing it through an orificed die plate where the dehydrated and solidified food product is formed into individual pieces. The pieces are then deposited into a hot oil chamber and, after frying, drained and deposited into a container for consumption.

37 Claims, 16 Drawing Sheets

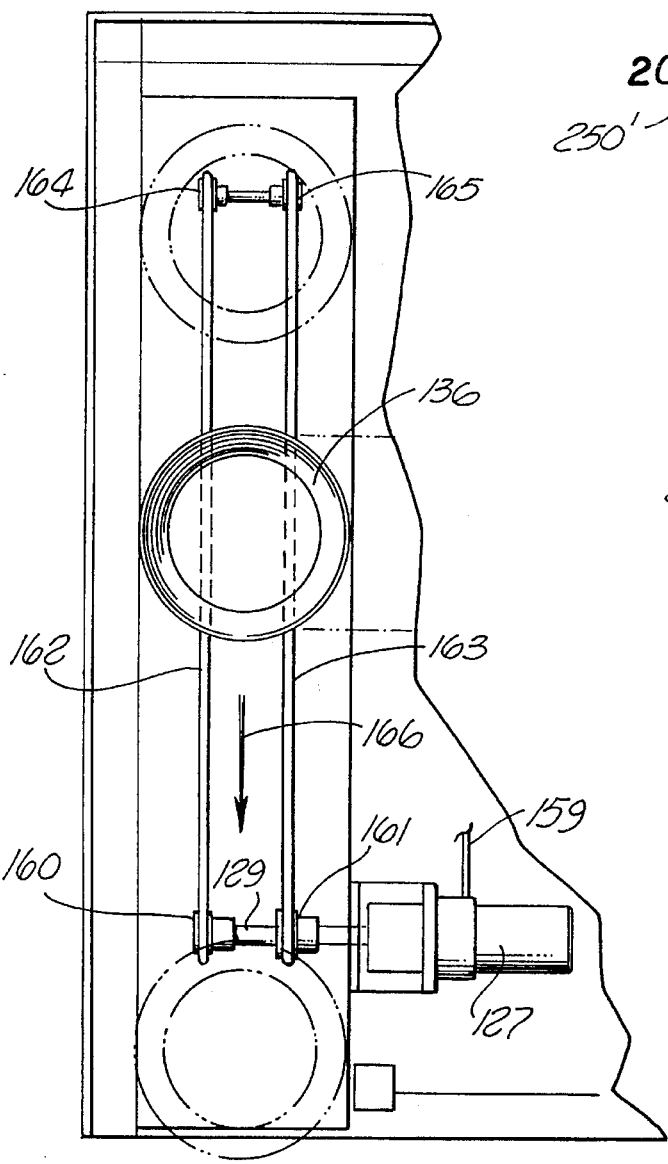
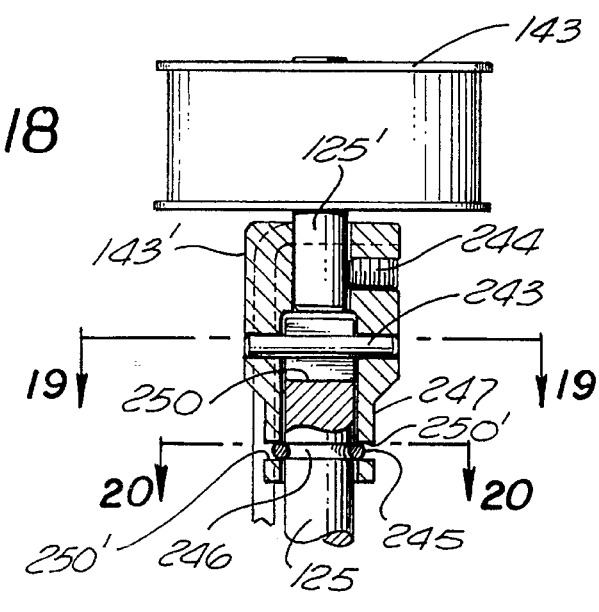
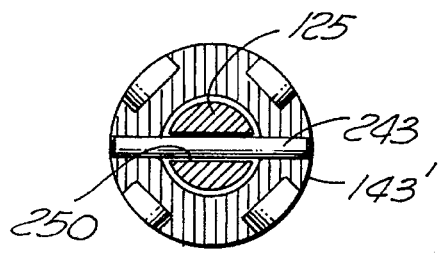
FIG. 18
FIG. 13
FIG. 19
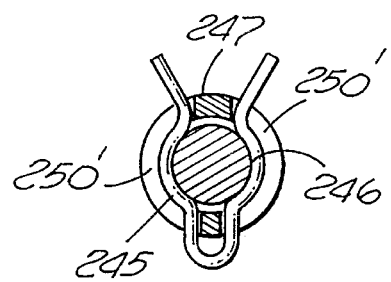
FIG. 20

1

SELF CONTAINED FRYING MACHINE

CROSS-REFERENCE To RELATED APPLICATION

This application is a Continuation-in-part of application Ser. No. 08/150,853, filed Aug. 11, 1993, now abandoned.

BACKGROUND OF THE INVENTION

1. Field of the Invention

The invention relates to frying machines; and, more particularly, to a self contained frying machine for producing a fried food product.

2. Description of the Prior Art

Many types of machines are known in the prior art for frying food products. Generally, such machines reconstitute dehydrated food products into a dough mixture, then cut the mixture into predetermined shaped pieces and fry the same.

Prior art devices have had problems in turning out a delectable non-oily food product in a quick, repetitive and efficient manner. Some prior art devices require much maintenance and attention and are thus not useful where inexperienced operators are involved.

There is thus a need for a frying machine which turns out a delectable non-oily food product in a quick and repetitive manner.

SUMMARY OF THE INVENTION

It is an object of this invention to provide an improved self contained frying machine.

It is a further object of this invention to provide an improved automated self contained french fry machine.

It is still another object of this invention to provide a fry machine for producing a food product, such as french fries, using a reconstituted dried granular vegetable product, such as potato granules.

These and other objects are preferably accomplished by providing a self contained frying machine having a storage area, a mixing chamber for receiving a pre-measured amount of dehydrated food product from the storage area and rehydrating and solidifying the same, and a piston for compressing the rehydrated food product and forcing it through an orificed die plate where the rehydrated and solidified food product is formed into individual pieces. The pieces are then deposited into a hot oil chamber and, after frying, drained and deposited into a container for consumption.

BRIEF DESCRIPTION OF THE DRAWING

FIG. 13 is a view taken along lines 13-13 of FIG. 2;

FIG. 18 is a view taken along lines 18—18 of FIG. 12;

FIGS. 19 and 20 are views taken along lines 19—19 and 20—20, respectively, of FIG. 18;

DESCRIPTION OF THE PREFERRED EMBODIMENT

Figure 1:
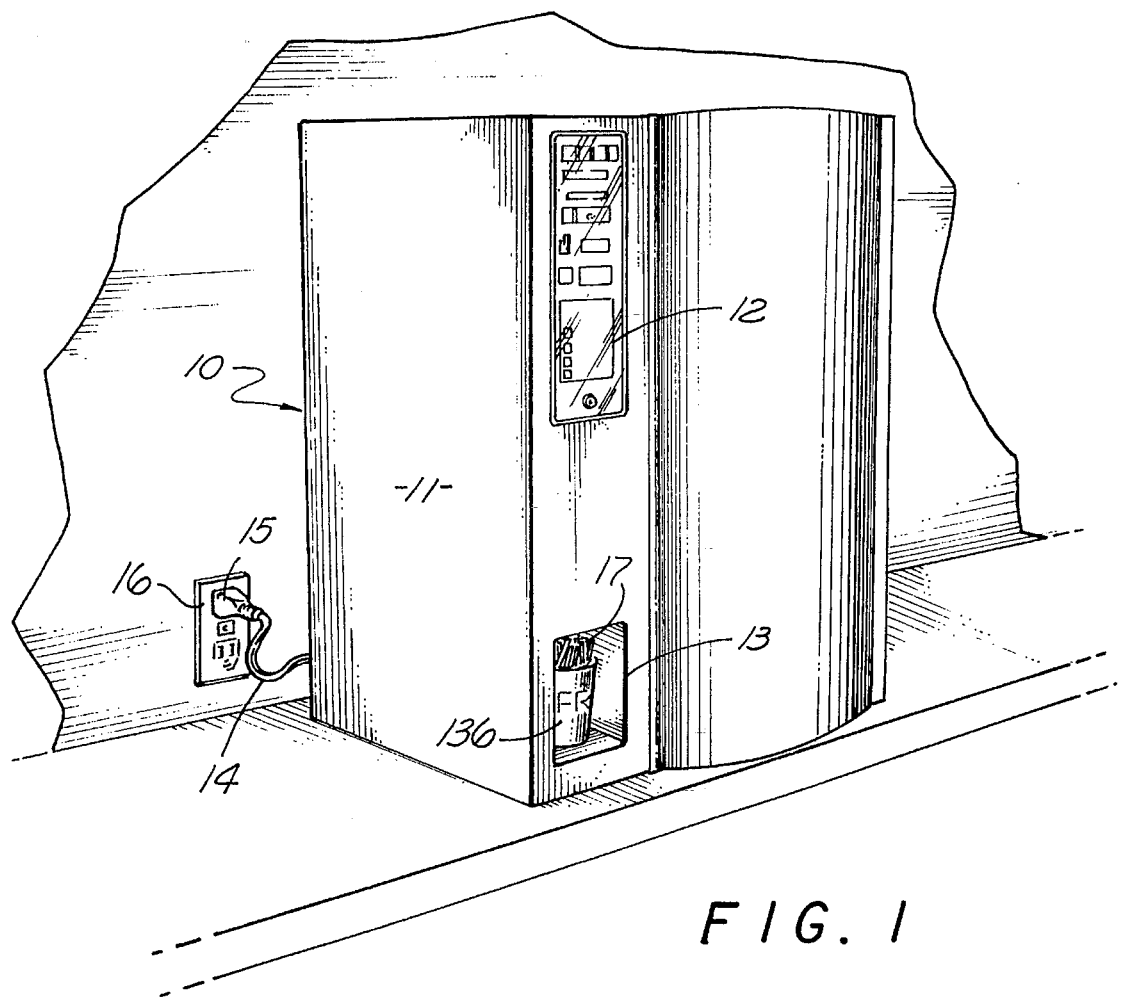
FIG. 1 is a perspective view of the fry machine of the invention.

Referring now to FIG. 1 of the invention, a fry machine 10 is shown having a housing 11, a front control panel 12 and a dispensing station 13. Machine 10 has an electrical cord 14 terminating in plug 15 which can be plugged into a suitable wall outlet 16. As seen in FIG. 1, a quantity of french fries 17 have been deposited into a cup 136 which is accessible in dispensing station 13.

Figure 2:
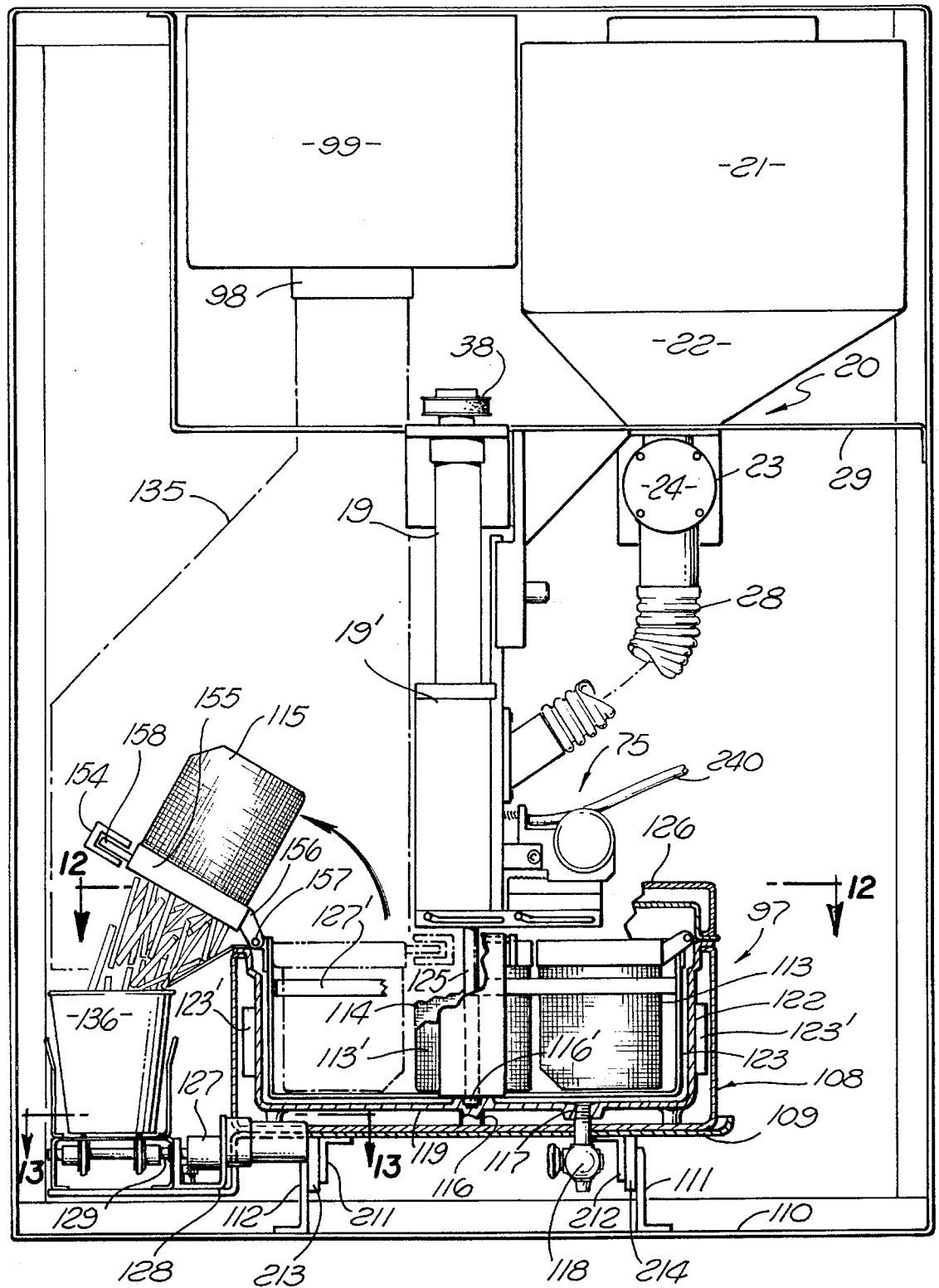
FIG. 2 is an elevational view of the fry machine of the invention.

Referring now to FIG. 2, wherein outer housing 11 has been removed, machine 10 includes an upper chamber 19 and a lower integral mixing chamber 19' for introducing a dried vegetable food product therein from a product supply and metering system 20.

Figure 3:
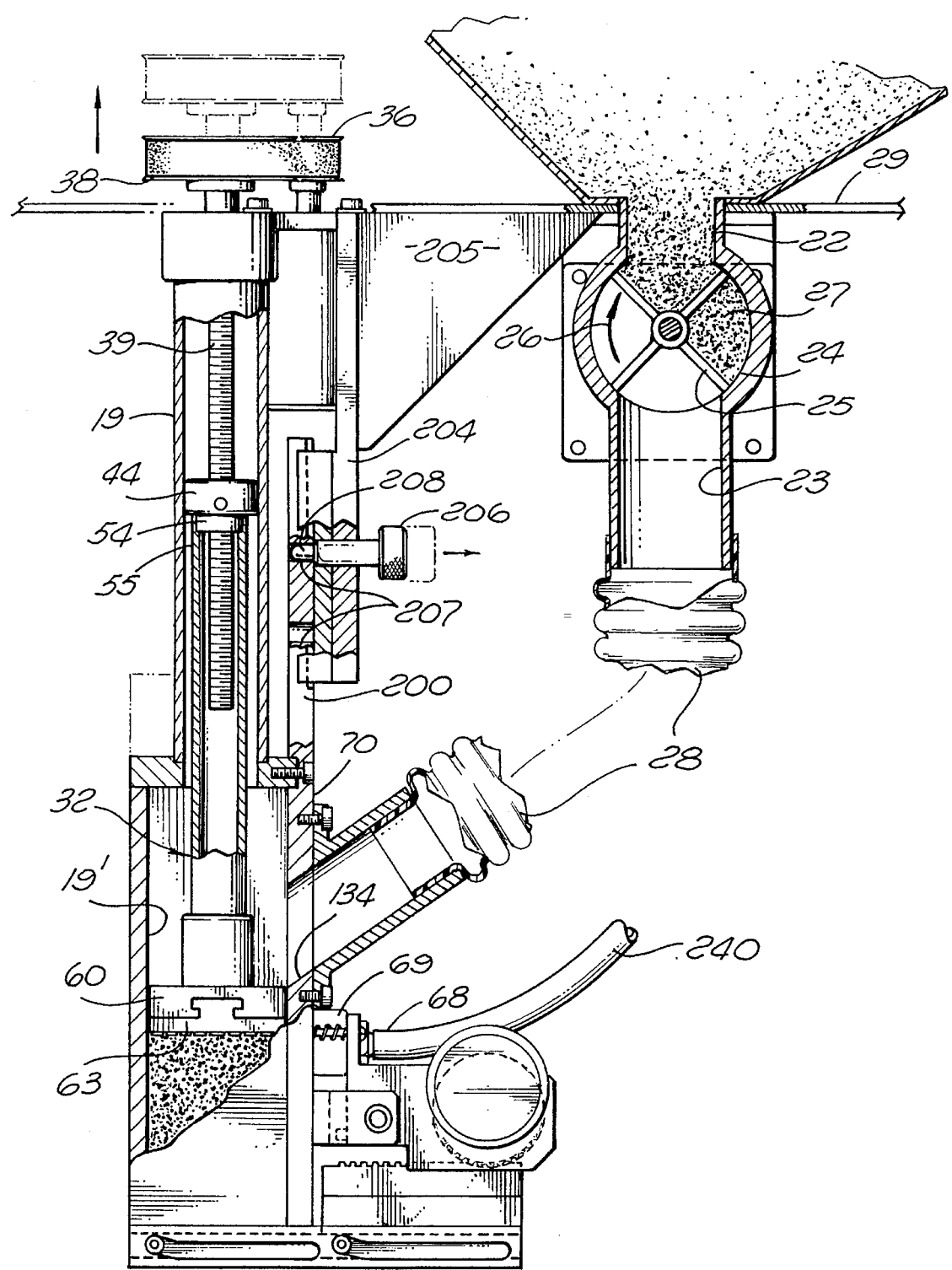
FIG. 3 is an elevational view of a portion of the machine of FIG. 2.

The food product is stored in a hopper 21 having a lower funnel portion 22, the outlet 23 of which is controlled by a product flow regulator 24. As seen in FIG. 3, regulator 24 can be divided into sections, such as four, by suitable baffles 25, and rotated in the direction of arrow 26 to deliver a predetermined amount of granular material 27 down product supply tube 28, which may be a flexible corrugated hose, by gravity. Regulator 24 is mounted to frame 29 (see also FIG. 9) by a housing 30" having an integral L-shaped mounting plate 30 having suitable openings 31 for receiving screws or the like. A gear motor 209 having an output shaft 210, engaging the center hollow rod 211 of regulator 24, is provided for rotating the same. A closure plate 30' having holes 31' for securing plate 30 to housing 30" is provided for closing off the opening leading in to housing 30".

Figure 9:
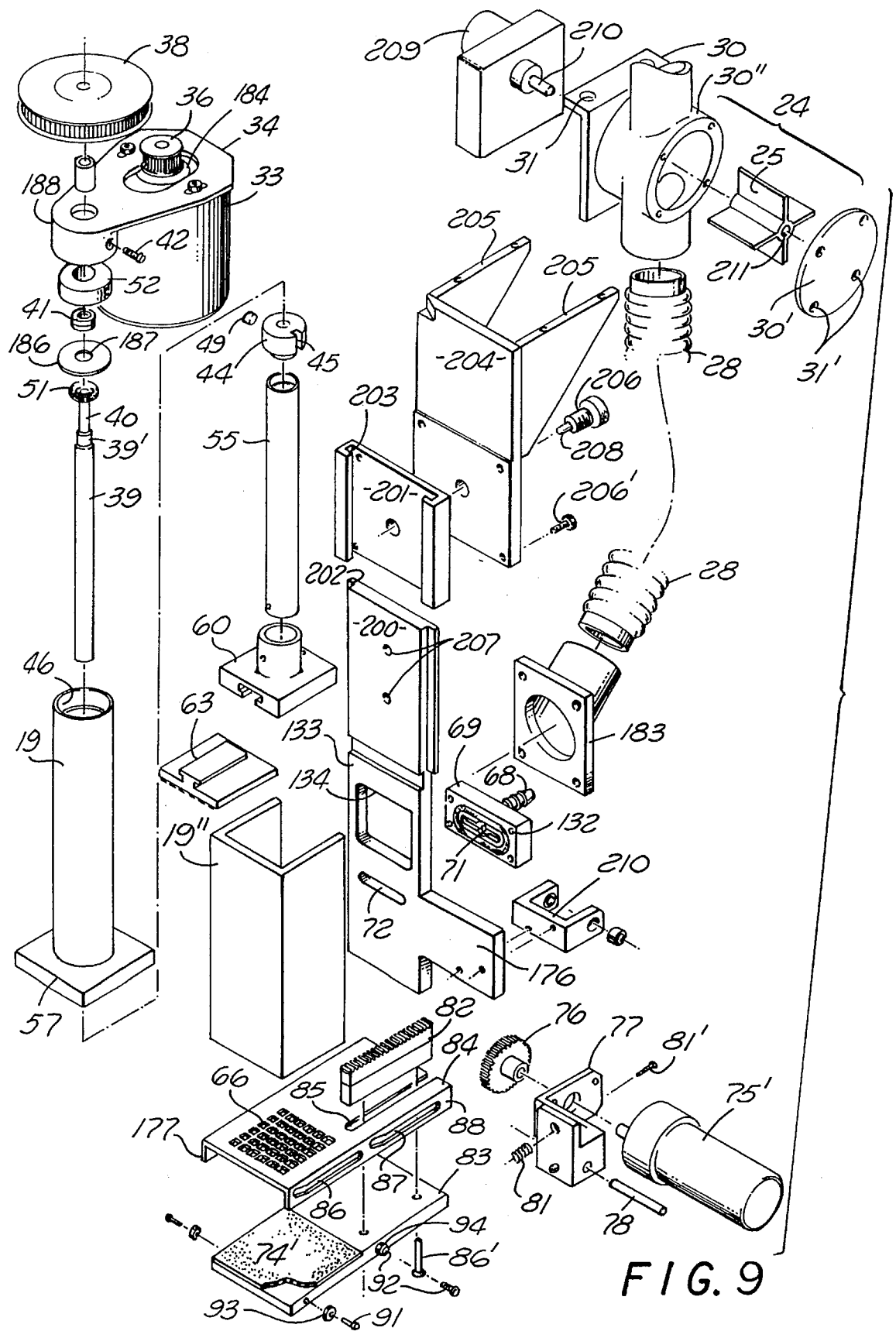
FIG. 9 is an exploded view of the fry machine of FIG. 1.

Product supply tube 28 terminates in an apertured plate 183 aligned with the interior of mixing chamber 19' (FIG. 3) through opening 134 (see also FIG. 9).

Figure 4:
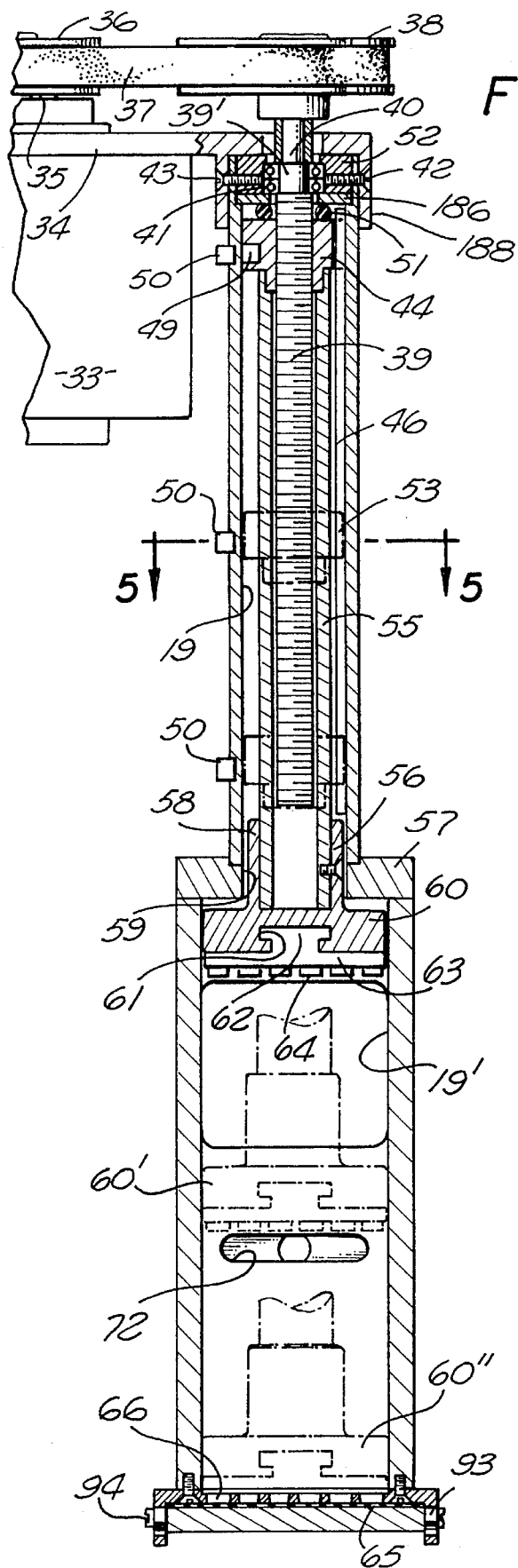
FIG. 4 is an elevational view, partly in section, of another portion of the machine of FIG. 2.

A ram assembly 32 (FIG. 3) is mounted in piston chamber 19 communicating with mixing chamber 19'. Ram assembly 32 includes a motor 33 (FIG. 4) coupled to a mounting plate 34 mounted to piston chamber 19. The output shaft 35 of motor 33 extends through a slot 184 (FIG. 9) in plate 34 and drives a pulley 36 having a belt 37 thereon (FIG. 4). Belt 37 extends to and engages a pulley 38 coupled to an elongated drive screw 39 vertically mounted in chamber 19. Drive screw 39 has a nonthreaded upper end 40 extending through a ball bearing assembly 41 mounted in a pillow block 52 locked in non-rotating position within chamber 19 by a pair of lock screws 42, 43. A washer 186 having a central hole 187 (FIG. 9) for receiving end 40 is disposed within cylindrical boss 188 integral with plate 34.

Chamber 19 is preferably cylindrical in cross section and chamber 19' (FIG. 4) is preferably rectangular in configuration and both are coaxially aligned and vertically mounted. Chamber 19' is thus preferably a U-shaped channel closed at the lower end by the extrusion die plate 66, and enclosed at the top by the wall 57 of the piston housing 19. The open side of the "U" channel portion 19" of chamber 19' (FIG. 9) mounts flush with the wall 176 having opening 134 therethrough providing an effective seal due to the closely machined surfaces. The upper end 200 of wall 176 slidably mounts in a plate 201 via mating edges 202 and slots 203, respectively, the final assembly being shown in FIG. 3. An outer plate 204 (FIG. 9) having integral spaced brackets 205 is secured to plate 201 by a plurality of threaded fasteners 206'. See FIG. 3 for final assembly where brackets 205 abut against the underside of frame 29. A pin 206 is provided on plate 204 which is preferably a spring biased releasable pin 206 mounted to plate 204 engaging vertically spaced holes 207 (FIG. 3) in plate 201 so that peg end 208 (see also FIG. 9) of pin 206 can enter selective holes 207 to releasably lock plate 204 to plate 201 for quick vertical separation for servicing and the like.

A bushing 44 (FIG. 3) is mounted within chamber 19 and, as seen in FIG. 9, has a cut-out keyway 45 receiving therein a key or elongated member 46 (see particularly FIG. 5) fixed to the inner wall of cylindrical housing 19 by one or more spaced screws 47.

Bushing 44 also has a magnet block 49 mounted therein adapted to coact with one or more sensors 50 mounted at spaced locations along housing 19 (see FIG. 4). Sensors 50 may be part of a circuit board for controlling the operation of machine 10. A resilient O-ring 51 (FIG. 9) is mounted within chamber 19 between pillow block 52 and the upper end of bushing 44 gripping threaded rod 39.

Figure 5:
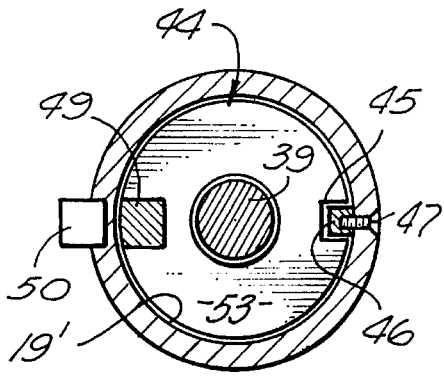
FIG. 5 is a view taken along lines 5—5 of FIG. 4.

As seen in FIG. 5, bushing 44 has a main body portion 53 of an outer diameter generally related to the inner diameter of housing 19 and a lower integral portion 54 (FIG. 3) relatively lesser in outer diameter. Portion 54 fits into the open upper end of a piston rod 55 which extends down to and is coupled to a piston support 56 (FIG. 4). Piston support 56 is mounted in the mixing chamber 19', the latter having an inner diameter greater than the inner diameter of upper piston chamber 19 and being separated therefrom by wall 57. Thus, piston support 56 has an upper portion 58 extending through an opening 59 in wall 57 and an integral lower portion 60, of greater outer diameter than upper portion 58, disposed in chamber 19'. Piston support 56 and rod 55 thus form a ram assembly.

Figure 14:
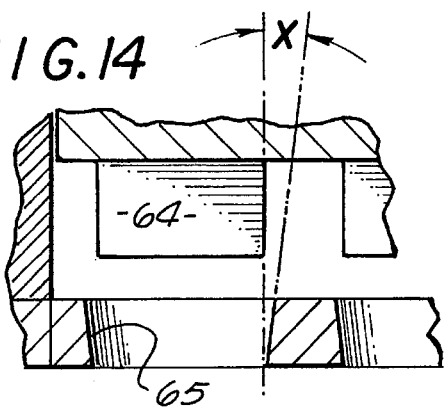
FIG. 14 is detailed view of a portion of the apparatus of FIG. 8.

The bottom of lower portion 60 (FIG. 7) has a T-shaped cut-out opening 61 receiving therein a like T-shaped section 62 of a face plate 63. Face plate 63 has a plurality of spaced protrusions 64 adapted to fit into holes 65 of a die plate 66 (see also FIG. 8). As seen in FIG. 14, the sides of teeth 64 are straight or vertical but the sides of holes may be slightly angled from the vertical as indicated at angle X, e.g., about 7°.

Figure 6:
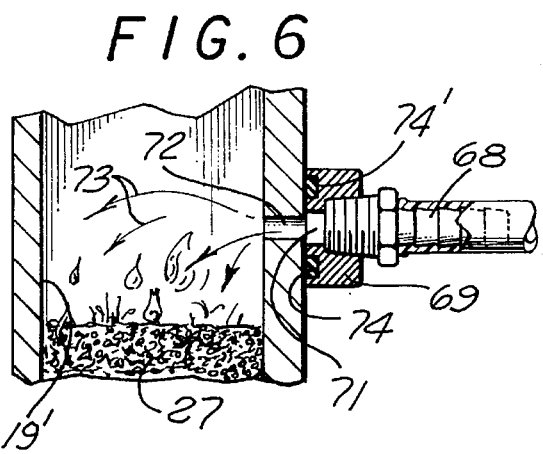
FIG. 6 is a detailed view, partly in section, of a portion of the fry machine of FIGS. 1 to 5.

As seen in FIGS. 6 and 9, a fluid inlet 68 is associated with the interior of chamber 19' threaded into a block 69 mounted to the outer wall 176 of housing 19' having an elongated opening 71 in fluid communication with a like configured opening or port 72 (see FIG. 4) in wall 176. As seen by arrows 73 in FIG. 6, water can be injected into chamber 19' through port 72 (FIG. 9) and into contact with mixture 27 for rehydrating the same as will be discussed. Port 72 may be an oblong opening. An O-ring 74 may be provided in a groove 74' in block 69 between block 69 and wall 176 for a fluid tight seal. Block 69 may be secured to wall 176 by screws (not shown) extending through holes 132 (FIG. 9) and into panel portion 133 of panel or wall 176 having opening 134 therethrough.

Figure 8:
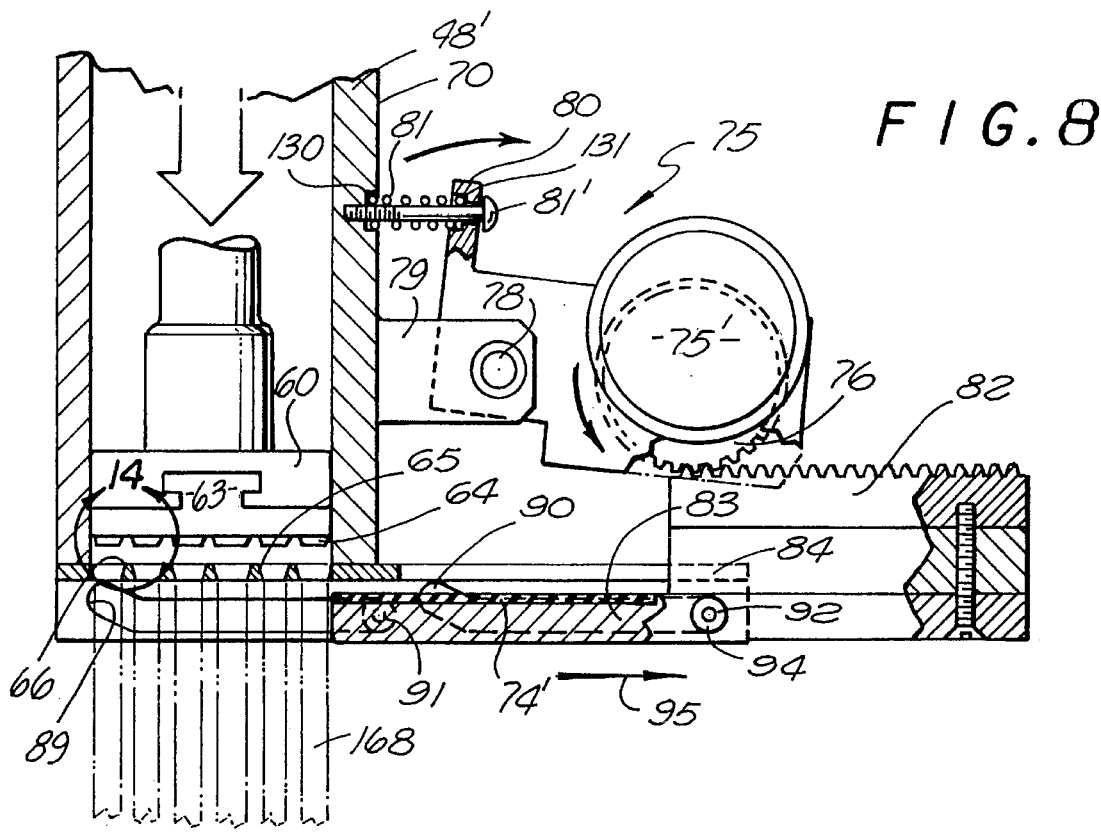
FIG. 8 is a view similar to FIG. 7 illustrating operation of a part of the fry machine of FIGS. 1 to 7.

As seen in FIGS. 8 and 9, a flat slide 83 is mounted to a panel 84. Slide 83 is activated through a rack and pinion gear assembly 75. A silicone gasket 74 is mounted on top of slide 83 at the forward end thereof. A die plate 66 is provided at the forward end of panel 84.

Figure 7:
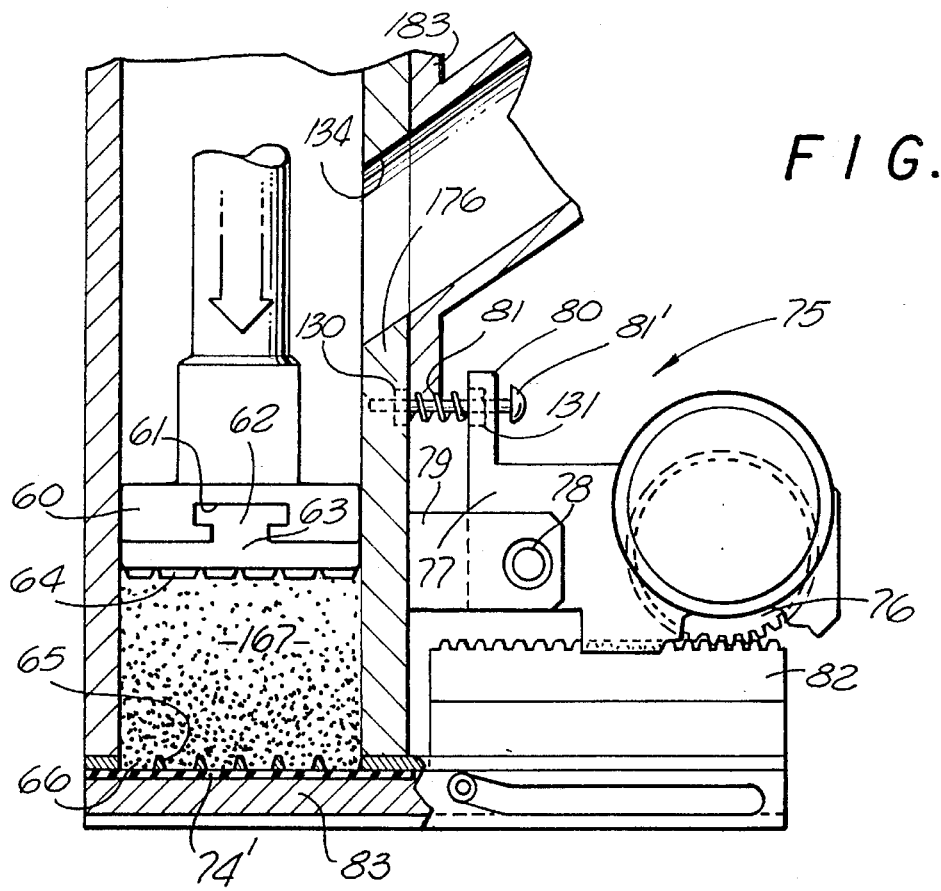
FIG. 7 is an elevational view, partly in section, of a portion of the fry machine of FIGS. 1 to 5.

As seen in FIGS. 7 and 9, assembly 75 includes a motor 75' driving a gear 76 mounted to an L-shaped housing 77 pivotally connected at pivot pin 78 to a U-shaped bracket 210 mounted to lower housing portion of wall 176. Upstanding extension portion 80 (FIG. 8) of housing 77 is biased against the outer wall 176 of housing 19' by a spring 81. Spring 81 is maintained in position by being disposed at each end within recesses 130 and 131 in panel or wall 176 and housing 77 respectively, as seen in dotted lines in FIG. 7. A screw 81' extends through portion 80 and the center of spring 81 threaded into plate of wall 176 of housing 19' as seen in FIGS. 7 and 9.

An elongated gear rack 82 is mounted to slide 83. As seen in FIG. 9, U-shaped panel 84 straddles base 83 and gear rack 82 is adapted to reciprocate within a slot 85 of panel 84 by means of a screw 86' threaded into rack member 82 and movable within slot 85.

A pair of elongated slots 86, 87 are provided on both side walls 88, 177 of panel 84. Each slot 86, 87 turns up slightly at ends 89, 90, respectively (FIG. 8). As seen in FIGS. 8 and 9, a pair of screws 91, 92 extend through cam followers 93, 94, respectively, and ride within slots 86, 87 (see FIG. 9). Cam followers 93, 94 have internally mounted ball bearings and screws 91, 92 are threaded thereto.

As seen in FIG. 7, as will be discussed, slide 83 is disposed below die plate 66. In FIG. 8, it has moved in the direction of arrow 95 moving gasket 74' away from die plate 66.

Figure 11:
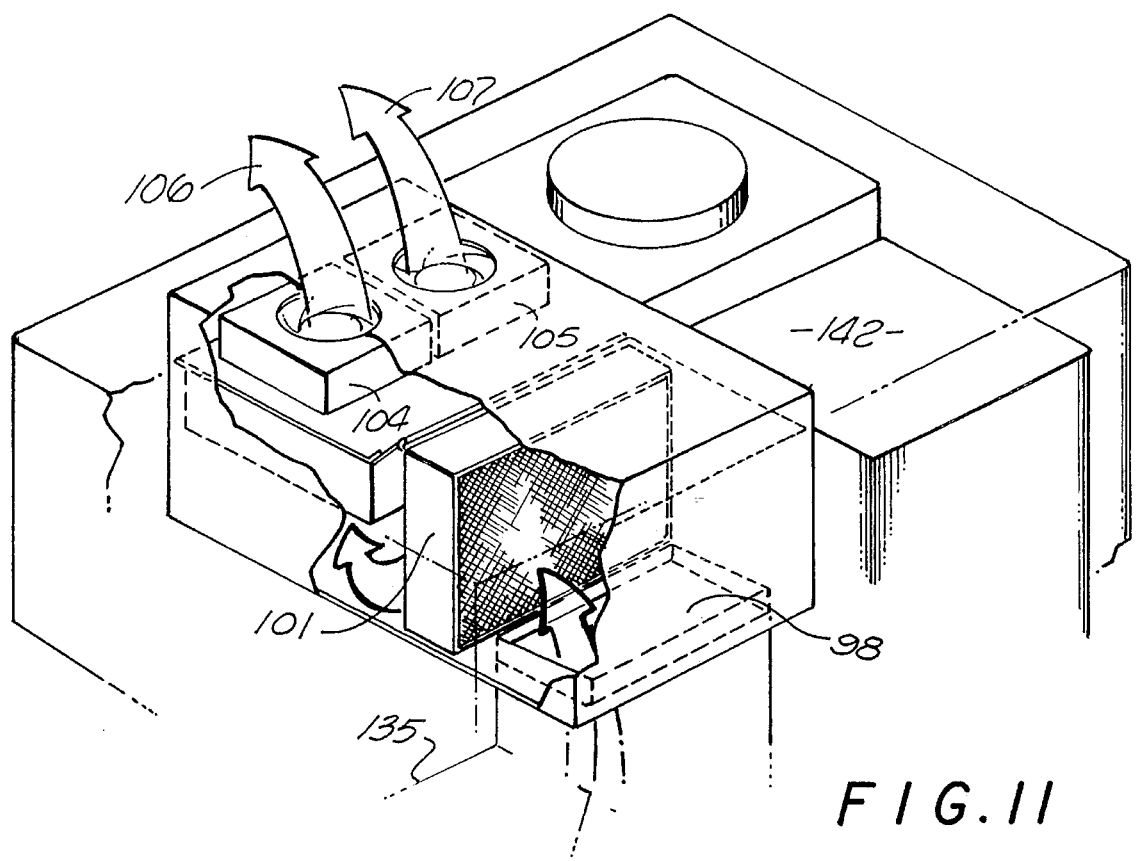
FIG. 11 is a perspective view of a portion of the fry machine of FIG. 1.
Figure 10:
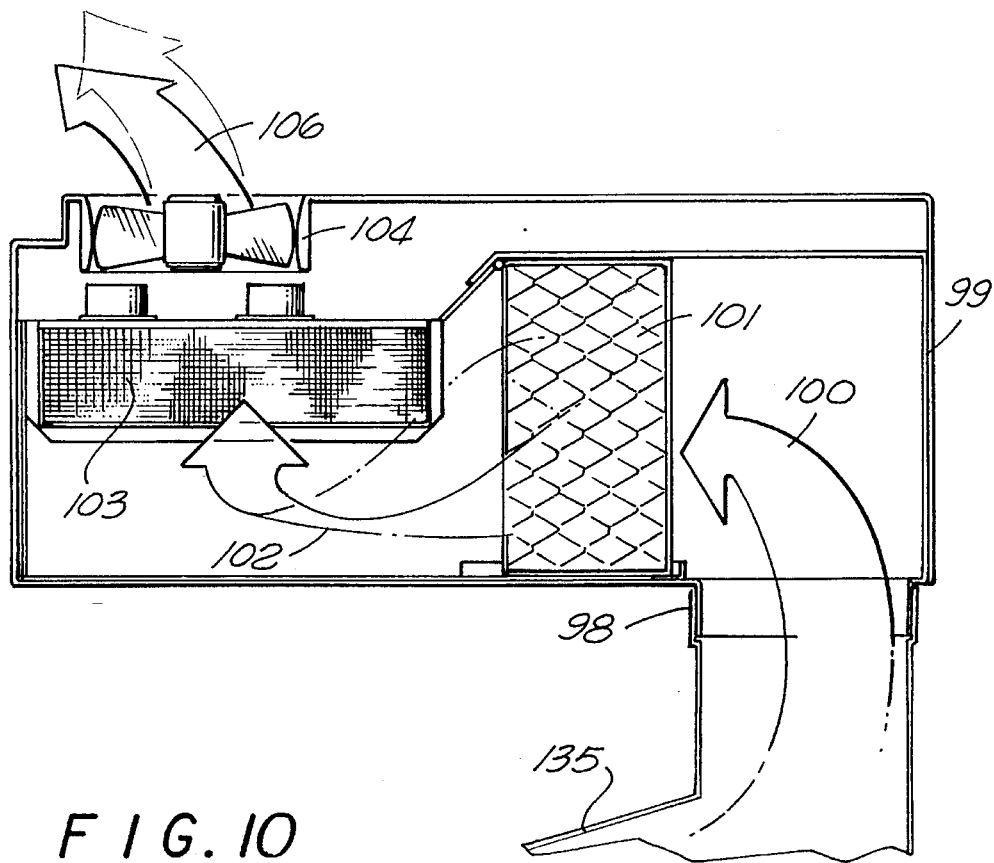
FIG. 10 is a detailed elevational view of a portion of the fry machine of FIG. 1.

An air management housing 99 (FIG. 2) is provided for exhausting the vapors from the cooking oil used in machine 10. Thus, as seen in FIGS. 10 and 11, vapors from cooking compartment 97 (FIG. 2) are removed to exhaust inlet 98 (FIG. 10) of housing 99 via exhaust tube 135 (shown in dotted lines in FIG. 2). The exhausted vapors, as indicated by arrow 100, pass through filter 101 and, as indicated by arrow 102, FIG. 10, pass through one or more filters 103 and then through a pair of fans 104, 105 (FIG. 11—of course, a single fan, or more than two may be provided). The vapors are then exhausted to the atmosphere as indicated by arrows 106, 107.

Exhaust tube 135 (FIG. 2) communicates at bottom with the final stage of the cooking process and dispensing of the cooked product into cup 136, as will be discussed.

Filters 101 may be media filters mounted in removable drawers and remove oil particles from the vapors. Filter 103 (FIG. 10) (or a plurality thereof) may be an activated charcoal filter, also mounted in a removable drawer, for removing odors from the filtered vapor prior to air being exhausted out of housing 99.

Cooking compartment 97 is shown in FIG. 2. Cooking compartment 97 includes a main assembly 108 mounted on frame 109 supported to the bottom wall 110 of housing 11 by a plurality of spaced support legs 111, 112. A fry pot 122 is mounted internally of assembly 108. A plurality, such as four, of frying baskets 113, 113', 114, 115, (only baskets 113, 114, 115 visible in FIG. 2-see FIG. 12) are mounted on a carousel 123 rotatably mounted inside of fry pot 122 at member 116. A threaded hole 117 is provided in the bottom wall 119 of pot 122, normally closed by ball valve 118, for draining the same.

A conventional band heater 123' is tightly clamped to the outside of fry pot 122. If desired, thermal insulation may be provided between band heater 123' and outer assembly 108. The carousel 123 mounts on its central axis at 116 and provides support and mounting for baskets 113 to 115. A vertical shaft 125 extends from bushing 116' through cover 126. A cylindrical band 127' extends about the carousel 123 for stiffening the same.

Figure 12:
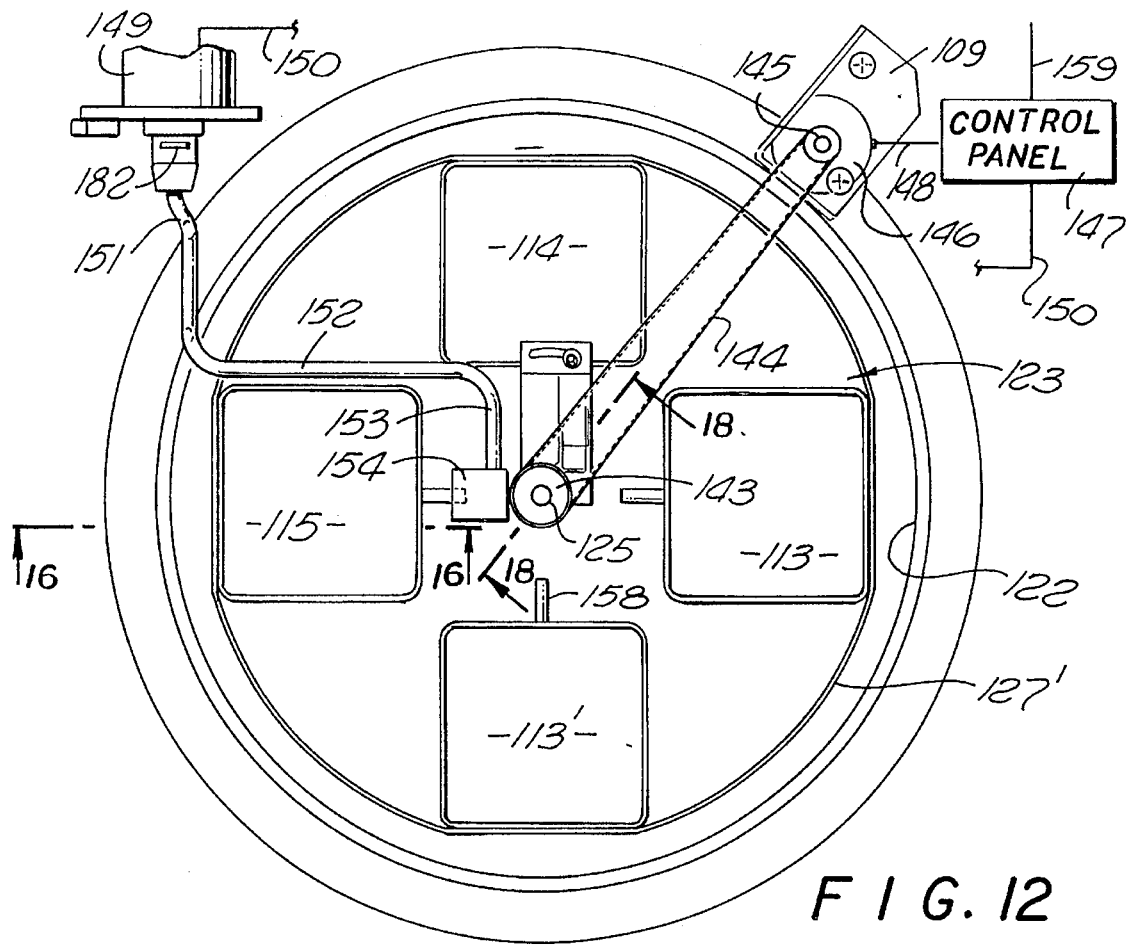
FIG. 12 is a view taken along lines 12—12 of FIG. 2.

Shaft 125 terminates at top in a pulley 143, FIG. 12, having a belt 144 extending to a motor shaft 145 rotated by motor 146 mounted to mounting plate 109. A control panel 147 is coupled in any suitable manner, e.g., by conduit 148, to motor 146 to control the operation thereof and rotation of shaft 145.

It can be appreciated that rotation of shaft 145 rotates shaft 125 via belt 144 and pulley 143 and thus carousel 123 to rotate baskets 113 to 115.

As seen in FIG. 12, a second motor 149 is also mounted to mounting plate 109 coupled via conduit 150 to control panel 147. Motor 149 rotates a shaft 151 extending first generally normal to plate 109 having an integral first extension portion 152 extending generally normal to shaft 151 with a second extension portion 153 extending normal to extension portion 152 and generally parallel to shaft 151. Extension portion 153 terminates in a U-shaped bracket 154 (see also FIG. 16).

Each basket 113 to 115 has a collar member 155 (FIG. 2) at top with an extension bracket 156 pivotally connected via pivot pin 157 to carousel 123. Each basket 113 to 115 has a pin 158 loosely disposed within bracket 154.

Figure 16:
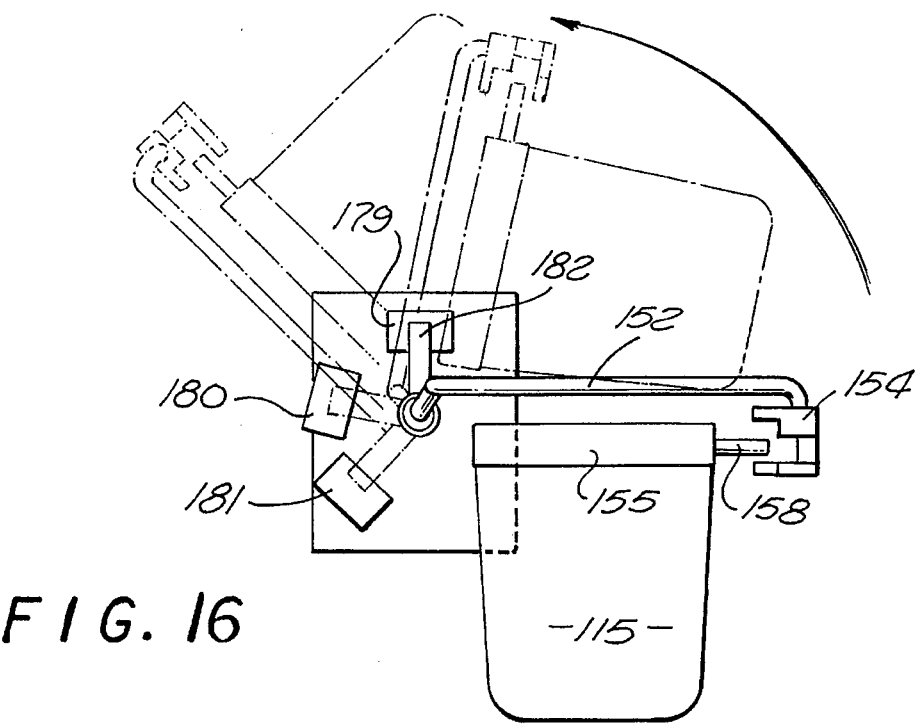
FIG. 16 is a detailed view taken along lines 16—16 of FIG. 12; of a portion of the operation of the apparatus of FIG. 12.

After the food products in the basket nearest the cup 136 are finished cooking, motor 149 is activated to lift shaft 151 (and thus bracket 154) from the solid line position shown in FIG. 16 to the dotted line or flipped position shown in FIG. 2. Motor 149 (FIG. 12) is preferably controlled by suitable electronics associated with panel 147 to hold basket 113 in an intermediate position (e.g., the middle dotted line position in FIG. 16) lifted out of the cooking oil in cooking pot 122 to drain the same prior to flipping the basket and thus dumping the food product onto slide 156' (FIG. 2) mounted to assembly 108 and thus into cup 136. Reversed rotation of motor 149 returns basket 113 to the dotted line position shown in FIG. 2 and the solid line position of basket 115 in FIG. 16. Rotation of carousel 123 rotates basket 115 and presents a subsequent basket, as basket 114 in FIG. 12, for emptying.

Cups 136 are moved selectively into operative position by an electric gear motor 127 (FIG. 2) mounted in sub-frame 128 rotating shaft 129. Motor 127 (FIG. 13) is coupled to control panel 147 (FIG. 12) by conduit 159 (FIG. 13) and controlled thereby to deposit cups 136 for filling with a food product.

Thus, motor 127 rotates shaft 129 and spaced pulleys 160, 161 coupled thereto for rotation therewith. Belts 162, 163 engage pulleys 160, 161, respectively, at one end, and like pulleys 164, 165, respectively, mounted at the other end. Cups 136 are disposed on top of belts 162, 163 (see FIG. 2) are pulled therealong by friction as motor 127 rotates shaft 129. Thus, as seen in FIG. 13, one cup 136 can be pulled to the basket position (solid line position) in the direction of arrow 166 as shaft 129 is rotated. The filled cups 136 are then moved to the food dispensing area shown in FIG. 1 (the forward dotted line position in FIG. 13).

Conventional cup dispensers for vending machines or the like are well known in the art and can be used to dispense one cup at a time to the food dispensing area.

Figure 17:
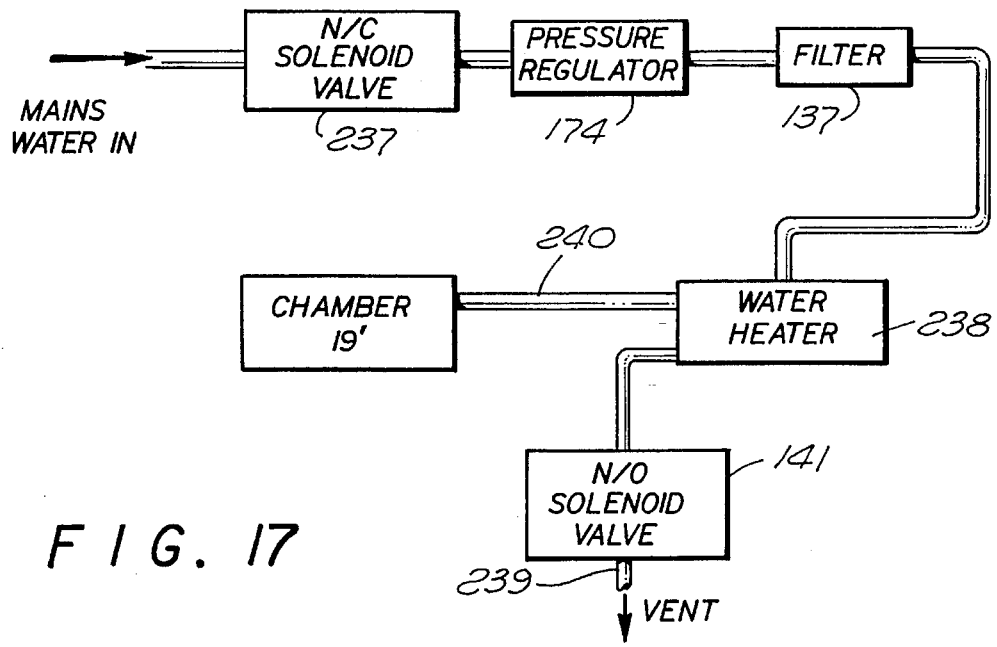
FIG. 17 is a schematic illustration of the water supply for the apparatus of the invention.

Water is introduced into machine 10 from any suitable source via an inlet leading to a normally closed solenoid valve 237 (FIG. 17). From there, the water passes through a pressure regulator 174 to filter 137. The filtered water from filter 137, which ensures that hard water deposits, solid particles or contaminants are removed, is then fed through water heater 238. The water introduced into filter 137 may preheated, if desired. The heated water is thus injected into chamber 19' through inlet tube 240 coupled to inlet 68 (FIG. 3). The water exiting heater 238 is effectively controlled by the combined interaction of (normally closed) solenoid valve 237 and (normally open) solenoid valve 141 which are energized simultaneously. When solenoid valve 237 is in the closed state, solenoid valve 141 remains open to allow the water chamber to remain at atmospheric pressure regardless of the effects of thermal expansion or contraction. When solenoid valve 237 opens, solenoid valve 141 closes assuring no water loss through the vent line, and assuring the correct predetermined water volume is introduced into the mixing chamber 19'.

Compartment 142 (FIG. 11) may contain therein a suitable source of cooking oil which may be a removable container used to manually refill cooking pot 122 after a predetermined number of cooking cycles.

Any suitable materials may be used. Remote controllers and hall effect sensors may be used throughout. Suitable remote controllers that may be used are the RF 300 models manufactured by VISITECT, Inc. of Fremont, Calif.

Any suitable temperatures may be used, such as a water inlet temperature of about 110° F. to 140° F. and a cooking oil temperature of about 350° F.

The apparatus of FIGS. 1 to 16 can be used to produce any suitable fried food product, such as a french fried potato. The apparatus 10 reconstitutes a dried, granular vegetable product, such as potato granules, fed by hopper 21 into chamber 19'. Dried granular potato products that may be used are well known in the prior art. One such product is described and claimed in U.S. Pat. No. 3,622,355.

After water is injected into chamber 19 at a predetermined temperature via port 72, the water is retained in chamber 19' in contact with the dried granular product a predetermined period of time sufficient for the dried granular product to reconstitute and form a dough.

Piston rod 55 is now activated to move downwardly as seen in FIG. 4 wherein piston portion 60 is shown in dotted lines 60' in one position, then in dotted lines 60" in a subsequent position.

Slide 83 (FIGS. 7 and 8) is in a blocking position (FIG. 7) under die plate 66 during reconstitution of the dried food product. Thus, piston portion 60 pushes dough 167 (FIG. 7) against slide 83 to form a block of dough. As seen in FIG. 8, motor 75' rotates gear 76 engaging gear rack 82 (FIG. 8) thus moving the same with pins 91, 92 riding in slots 86, 87. This retracts slide 83 to move it to the FIG. 8 position. Further actuation of piston rod 55 forces the face place 63 of piston portion 60 against dough 167 through the openings 65 in the die plate 66, the teeth 64 entering openings 65 (see FIG. 8) forcing the dough 167 through the holes 65 in die plate 66 forming strips 168 of shape retaining dough, e.g., potato strips. The holes 65 and engagement of the same by teeth 64 serve to form strips 168 into a specific shape.

The extruded potato strips are then deposited into contact with the cooking oil in baskets 113 to 115 (FIG. 2). After frying the strips to a predetermined fried state, the baskets, such as basket 113 in FIG. 2 and as heretofore discussed, are lifted out of contact with the cooking oil in fry pot 122, drained, then flipped so that the fried strips fall out of basket 113 into cup 136 (the latter having been moved into operative position, as seen in FIG. 2, by rotation of belts 162, 163 as heretofore discussed). Cup 136, as seen in FIG. 1, is now moved to dispensing station 13 and the french fries 17 can be removed and consumed by the user. A subsequent cup is moved into position via belts 162, 163 and a subsequent basket is also moved into the FIG. 2 position to deposit another batch of french fries.

Thus, the interior of chamber 19' is closed off during the process of introduction of the granular material and water charge by the sliding plate 83 below the extrusion die plate 66. The water is allowed sufficient time to permeate the granular material to form a homogenous mass of reconstituted dough. When the plate 83 is opened, and piston 60 pushes the dough through the orifices 65 in die plate 66, the food product is shaped and the shaped dough is deposited by gravity into the frying oil in fry pot 122.

Teflon may be provided on the blade 63 of piston portion 60. That, in conjunction with the vertical positioning of chamber 19' eliminates the need for any cut-off mechanism to separate the formed food product from die plate 66. Additionally, residual build-up of food material is diminished thereby reducing the need for non-periodic cleaning.

The piston 60 may be easily removed and replaced by nontechnical service persons without need of special tools for normal and periodic maintenance and cleaning.

The cooking pot 122 and cover 126 may be easily separated through the use of activating over-center toggle clamps, (not shown) facilitating cleaning activities. The internal surfaces of the pot 122 and cover 126 may be treated with Teflon to enable thickened and burned oil to be easily removed.

The cooking oil in pot 122 may be easily removed and replaced. Thus, as seen in FIG. 2, legs 111, 112 are stationary and brackets 211, 212 are mounted to the underside of frame 109. Conventional ball bearing slides 213, 214 are interposed between brackets 211, 212 and legs 111, 112, respectively. Thus, in order to facilitate the process, the cooking pot 122 may be pulled outwardly of the enclosure on its guide rails or legs 111, 112. A ball valve 118 is opened allowing the oil to be drained into a suitable container (not shown). Replacement of the cooking oil is accomplished by pouring the new oil into the pot 122 through a suitable opening (not shown) in the pot cover 126.

The cooking pot 122 and cover 126 may be thermally insulated to reduce the chance of burn hazard to maintenance personnel, and to reduce power consumption of the apparatus 10.

The cooking pot 122 and air management system (FIG. 11) may be closely coupled via conduit 135 to maintain cleanliness within the interior of the machine 10 and to keep a high level of efficiency of the air filter system (FIG. 11).

The air filter assembly is comprised of a plurality of media air filters 101, for the removal of oil particles, and an activated charcoal filter 103 may be used to remove or reduce cooking odors.

Hall effect sensors 50 are preferably used throughout the apparatus 10. The sensors 50 are incorporated so that periodic adjustments are not required, and the specific activation points are not subject to drift. High reliability of the apparatus is obtained. The temperature of the water used may be pre-set by the manufacturer for the optimum temperature for vegetable product rehydration. The solenoid valve activation time may be controlled by suitable microcontrollers. The duration of the solenoid valve open cycle may be used to determine the volume of water which is injected into the rehydration chamber 19'. Pressure regulators may be used to assure consistent water volume regardless of inlet line pressure.

Slide 83 rides between side walls 88, 177 of panel 84 (FIG. 9), and below the extrusion die plate 66. The of slide 83 retracts prior to extrusion of the vegetable dough as a result of the activation of the ram assembly, the face of which is the blade portion 63. The formed dough pieces separate from the extrusion die plate 66 as a result of their weight. At the end of the extrusion cycle, the ram is activated and the piston rod 55 is retracted to a position effectively blocking the opening 134. After the vegetable product is extruded, the slide 83 closes. The slide 83 is activated through the use of the rack and pinion mechanism 76, 82. The gear 76 meshes with the adapter or rack member 82 which is in turn mounted to the slide 83 via slot 85 (FIG. 9) and screw 86' engaging member 82. Plate 74 is free to move in a linear direction perpendicular to the bore of chamber 19' along machined notches provided by walls 88, 177. The member 82 may also have provisions for mounting suitable magnets. The hall effect sensors indicate to the microprocessor (as will be discussed) the position the slide 83. At the appropriate time, the microprocessor applies a current to the slide motor 75'.

The piston activation mechanism is described as follows: the piston portion 60, piston support being provided by the walls of chamber 19, piston rod 55, and piston bushing 44 are affixed to each other through the use of pins or other fasteners, and are non-rotating elements that are capable of linear, vertical movement on a common axis within the chamber 19. This movement is accomplished through the use of a key 46 (FIG. 5) attached to the bore of the chamber 19', and a keyway 45 in the bushing 44. The bushing 44 is threaded on its inside diameter to allow engagement with the drive screw 39. The top end of the support chamber tube 19' is mounted to a bearing pillow block 52 which contains a ball bearing assembly 41. Screw 39 has an upper stepped portion 39' extending into assembly 41. The drive screw 39, being threaded into the bushing 44 and attached to the bearing assembly 41, is capable of rotary motion about its axis. This rotary action causes linear, vertical motion along the axis of the chamber 19 by the piston rod 55.

An additional function of the bearing pillow block 52 is to allow a mounting location for the drive motor mounting plate 34. The drive motor 33 is attached to the motor mounting plate 34 on its under side with the axis of the motor parallel to the axis of the drive screw 39. The motor shaft 35 and drive screw 39 are coupled through the use of pulleys 36, 38 and cog belt 37. The speed of the motor 33, size of the drive pulleys 36, 38 and belt 37 are selected to drive the piston rod 55 at the required speed.

Product measuring regulator 24 (see also FIG. 9) regulates product flow from the hopper 21 into the product transfer tube 28. The carousel 123 indexes about the fry pot centerline 90° at a time, positioning the baskets 113–115 at two specific locations at the correct times. One of the two specific locations is directly under the extrusion die plate 66, the other is at the product ejection area where the cooked food product is removed from the cooking oil and dispensed into the paper cup 136 via a flipping action of the basket as heretofore described.

The upper end of the carousel shaft 125 is coupled to the carousel drive motor 146 (FIG. 12) by a cog belt and pulley 143, 144. A sliding sleeve 143' (FIG. 18) may be coupled to shaft portion 125' coupled to pulley 143 to disconnect the drive belt to aid in cleaning. Locking pin 243 (FIG. 19) extends through sleeve 143' and a slot 250 in shaft 125 to retain the same thereto. A set screw 244 (FIG. 18) locks sleeve 143' to shaft portion 125' to prevent relative rotation. A resilient removable clip 245 snaps into spaced slots 250' in the lower end 247 (FIG. 18) of sleeve 143' and a groove 246 in shaft 125 to couple sleeve 143' to shaft 125. It can be seen that removing clip 245 enables sleeve 143' to be disengaged from shaft 125 allowing disengagement of pulley 143, shaft portion 125', pin 243, sleeve 143', and belt 144 for cleaning. This enables disconnecting the motor 146 from the carousel shaft 125 so that the pot 122 may be pulled partially out of the operating position for cleaning and refilling of the cooking oil.

The mechanism that empties the basket consists of the electrical gear motor 149, and basket shaft 151. The basket shaft 151 has a notched bracket 154 (FIG. 16) that engages with a pin 158 on the fry basket when the basket is positioned for product dispensing. Hall effect sensors, such as sensors may be radially mounted near the electrical motor output shaft 151. The sensors detect three positions, the normal position (basket in pot), intermediate position (draining position), and dispensing position. The electrical motor 149 receives current at the designated time from the microprocessor associated with control panel 147.

FIG. 15 is a flow diagram of the operation of the operation of machine 10. The following assumptions are present:

1. Oil is at operating temperature.
2. Water is at operating temperature.
3. Powdered product, such as a potato product, is present in hopper 21.
4. Cup supply is full.
5. Piston rod 55 is in the DOWN position.
6. Valve 74 is in the OPEN position.
7. Baskets are all in cooking position.
8. Baskets are at rest (not flipped).
9. Baskets rotate approximately each 24 seconds—time is settable to control cooking time in the oil.

Figure 15A:
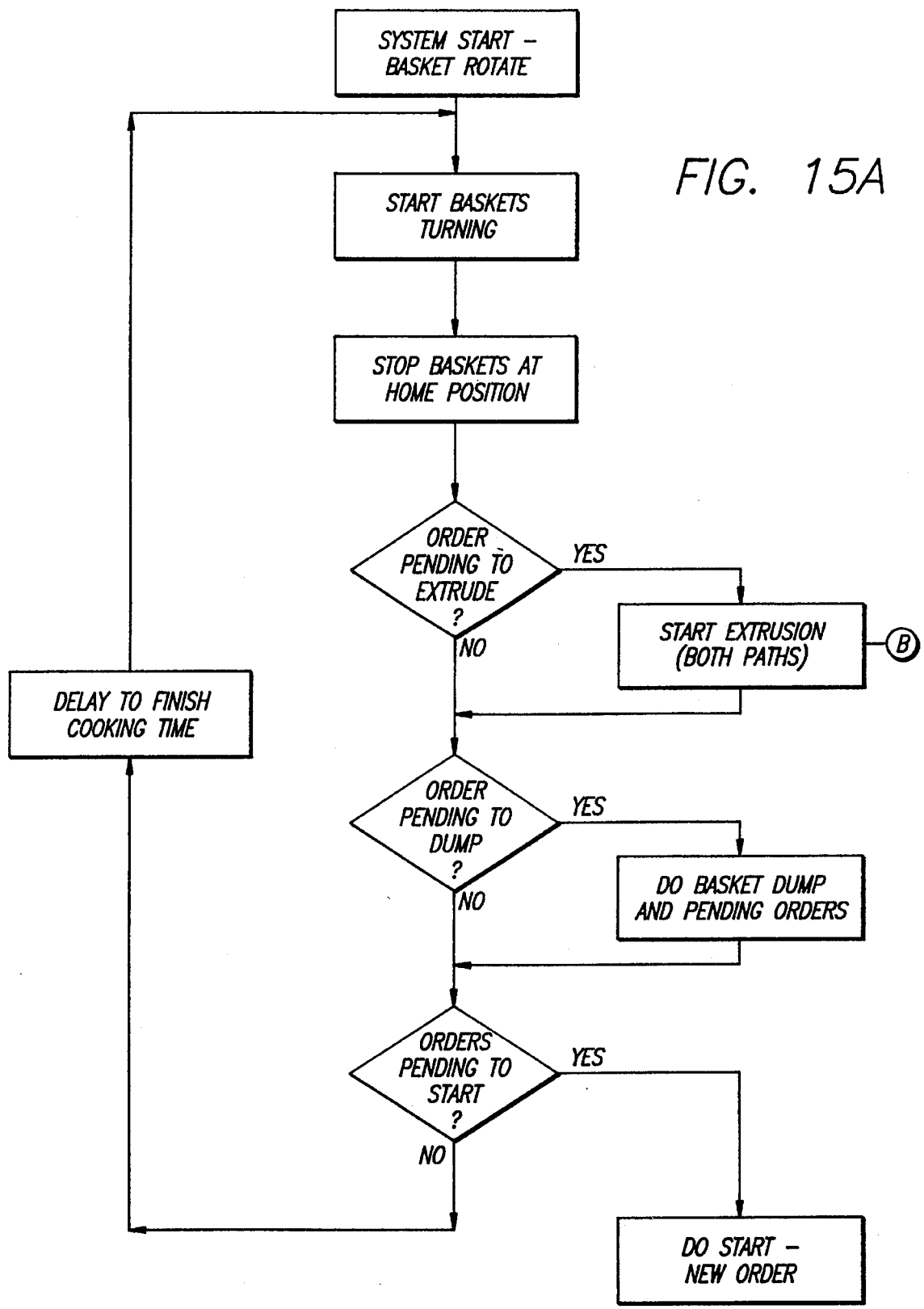
FIG. 15A is a preferred flow diagram of the first step operating the apparatus of FIGS. 1 to 13.
Figure 15B:
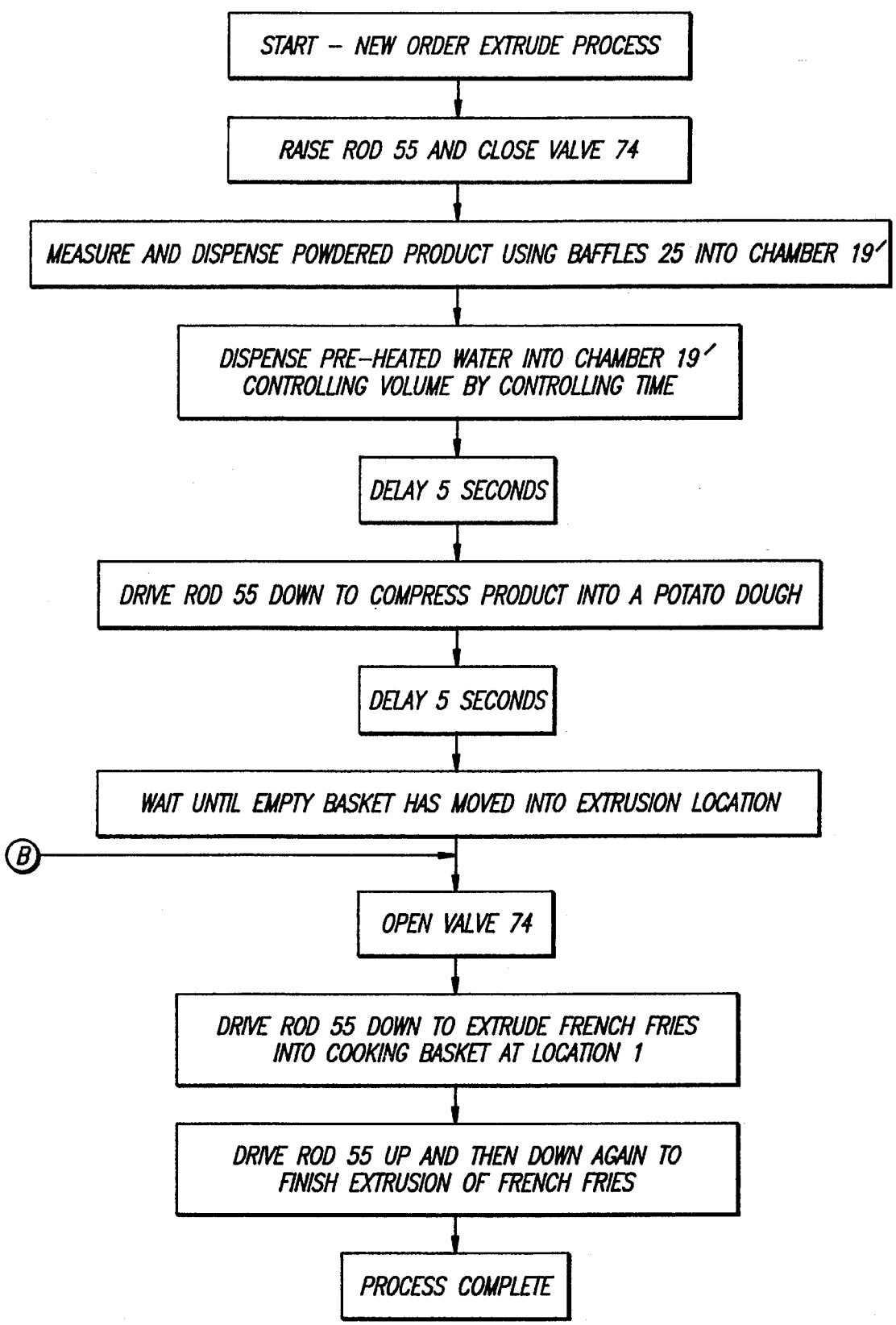
FIG. 15B is a flow diagram of the second step of operating the apparatus of FIGS. 1 to 13.
Figure 15C:
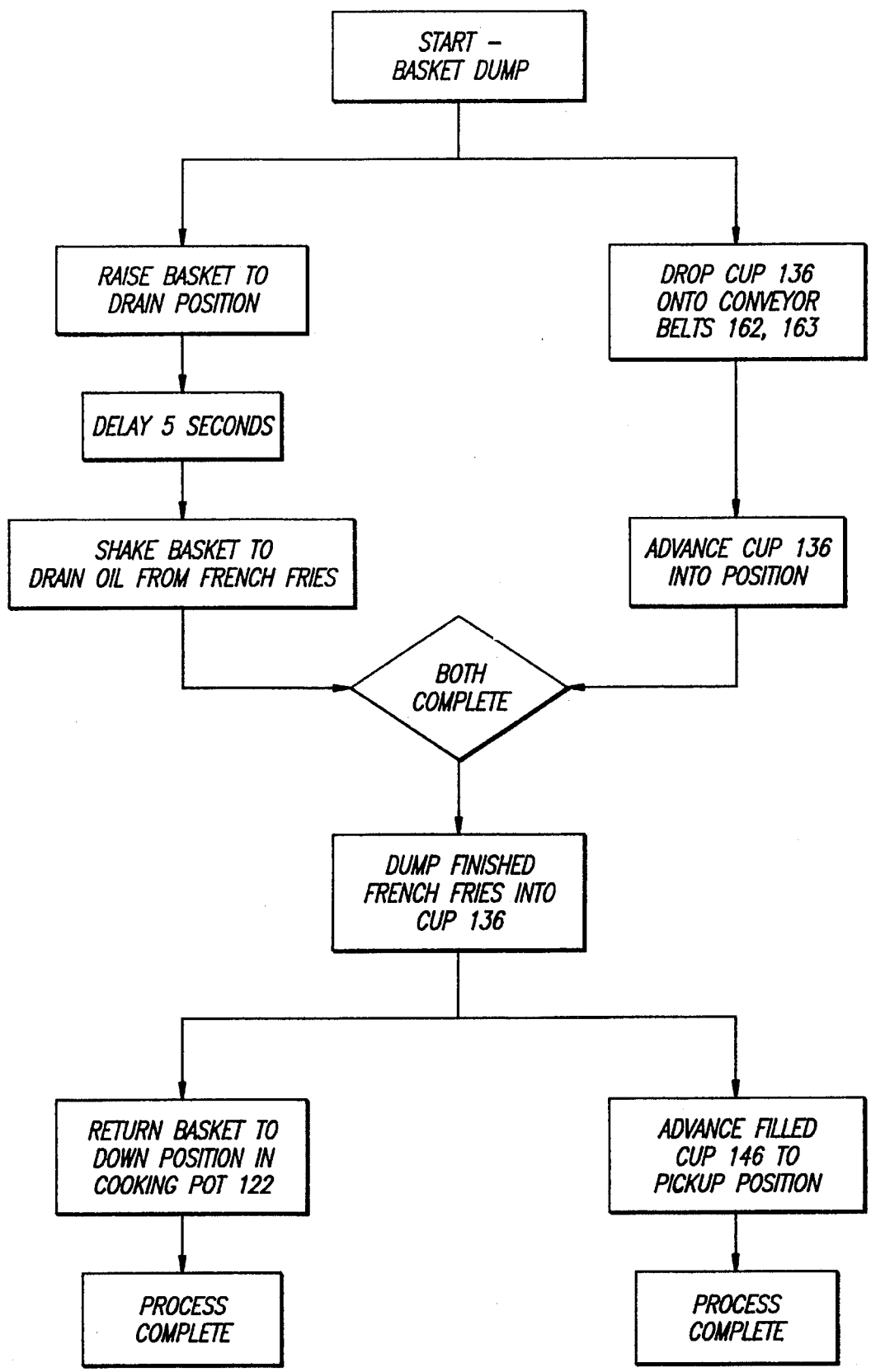
FIG. 15C is a flow diagram of the third step of operating the apparatus of FIGS. 1 to 13.

As seen in FIG. 15, there are three positions. First, or FIG. 15A, System Start where the baskets are rotated. Second, or FIG. 15B, a New Order is entered and the extrusion process begins. Third, or FIG. 15C, the first basket is flipped to dump the fried product.

In the FIG. 15A position, the baskets start turning, then are stopped at the home position. If the electronic controls provided by the hall sensors, magnets, and other components forming the microprocessor controller of panel 147 do not detect an order, no product is extruded into the baskets. If there is an order, extrusion is begun (see FIG. 15B) (point B in FIG. 15A coincides with point B in FIG. 15B). The home position referred to in FIG. 15A would be the basket directly below the strips 168 in FIG. 8 and not visible in FIG. 2.

At station FIG. 15C, the cooked fries in basket 113' (not visible in FIG. 2—see FIG. 12) are drained and flipped into cup 136.

Any suitable temperatures may be used, such as 350° F. for the cooking oil and about 140° F. for the incoming water. Any suitable electronics known in the art may be used to carry out automatically the steps set forth in the flow diagram of FIG. 15. For example, so called smart blocks manufactured by Z-World, Inc. may be used to send impulses to the various motors and signal an IO board when to open a solenoid valve, such as valves 141, 171. Hall effect sensors are well known in the art which cooperate with strategically placed magnets mounted at suitable locations as heretofore discussed. Such sensors emit electric signals which are fed to the microprocessor controller 175. Of course, other means may be used to operate machine 10.

Any suitable powdered vegetable product that can be reconstituted by the introduction of water may be used. However, machine 10 is particularly suited to making french fries and a suitable dehydrated potato product that may be used as described in U.S. Pat. No. 3,622,355 to Beck, et al.

Although the embodiment of FIGS. 1 to 20 works quite well, there may be clumping problems with the extruded shaped strips 168 extruded from die 66 into the frying baskets 113, 113', 114 and 115 as seen in FIG. 8. The fries 168, at roughly room temperature, enter the hot oil in the baskets 113, 113', 114 and 115, which may be at a temperature of 350° Farenheit. This difference in temperature may cause strips 168 to clump together in the baskets into which they are deposited.

Figure 21:
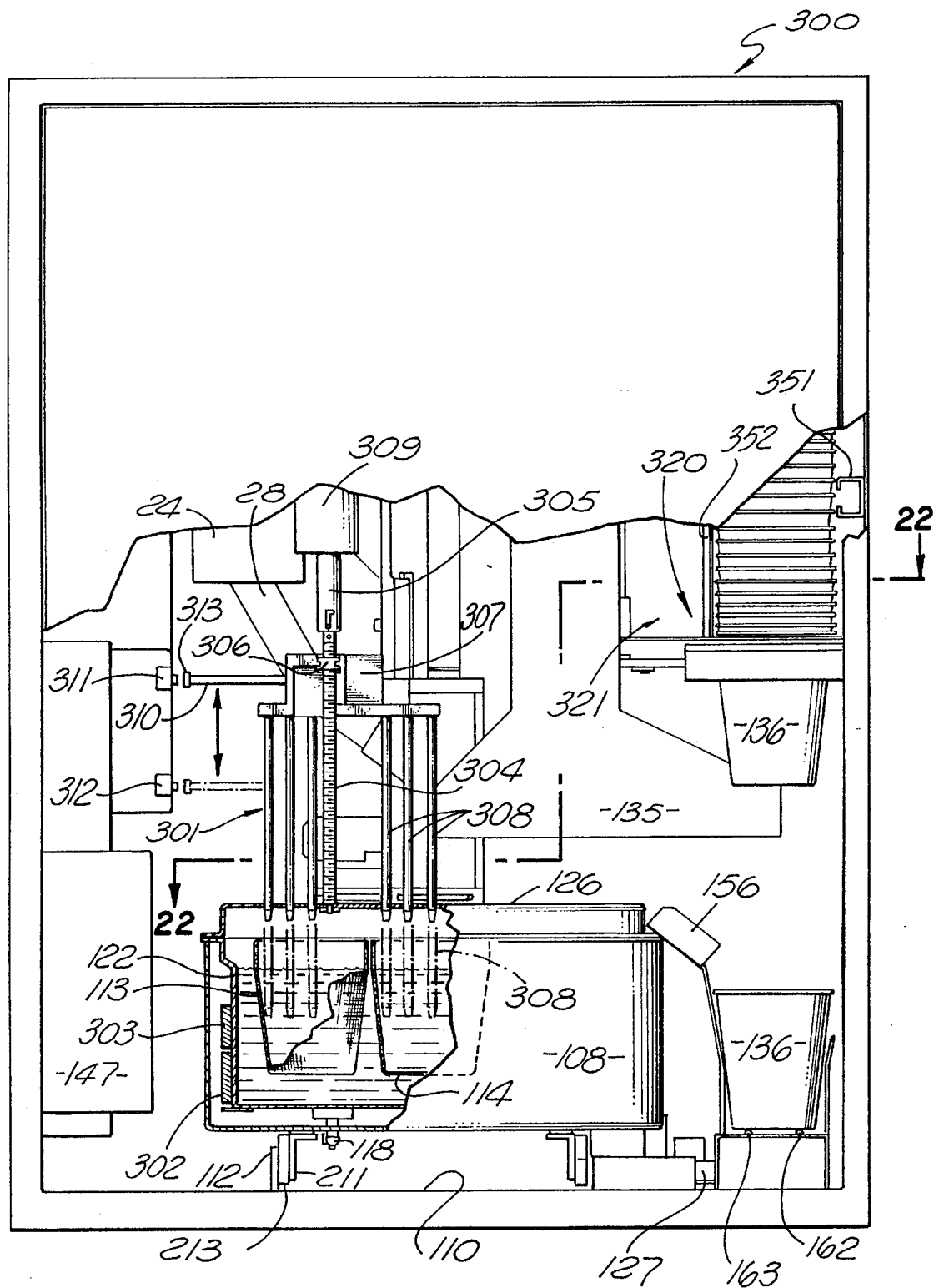
FIG. 21 is an elevational view of a portion of the apparatus of FIGS. 1 to 20 showing a modification thereof.

Thus, as seen in FIG. 21 wherein like numerals refer to like parts of the machine of FIGS. 1 to 20, machine 300 may have clump preventing means 301 associated therewith. Thus, instead of one heater 123' a pair of band heaters 302, 303 are provided, for better heat control, on the side of pot 122 as discussed with respect to aforementioned single heater 123'. The view in FIG. 21 is of the rear of the apparatus of FIG. 8; thus, the strips 168 have already been deposited in the baskets 113, 114 and the baskets 113, 114 have moved as heretofore discussed to the position shown in FIG. 21.

A reversible motor 309 rotates an elongated drive screw 304 passing through sleeve 305 to motor 309.

A nut 306 on screw 304 is fixedly coupled to a dibber housing 307 having a plurality, such as six, of downwardly extending vertical dibber rods 308. Rods 308 are spaced from each other and in a pair of three rods to a set so that three rods 308 are vertically aligned with the interior of basket 113 and three rods 308 are vertically aligned with basket 114.

As will be discussed, these rods 308 are preferably of stainless steel so that a temperature differential is provided between rods 308 and the hot oil in pot 122. Thus, any suitable materials may be used that creates such differential and can be used repeatedly. Stainless steel is also preferred inasmuch as the rods 308 would then be self cleaning.

Figure 22:
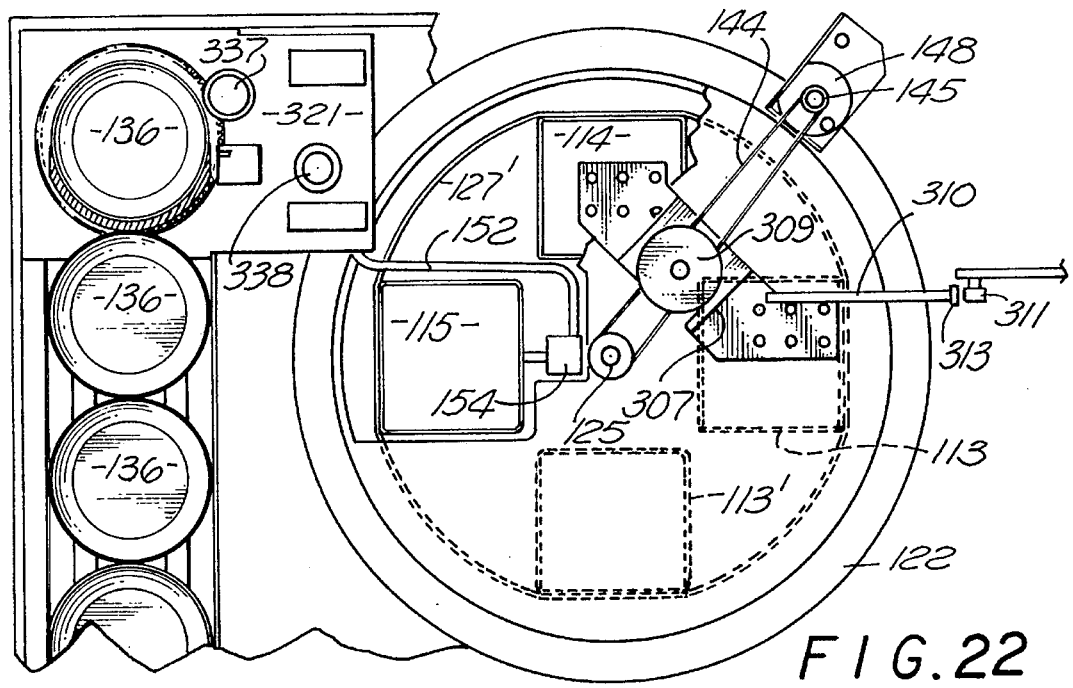
FIG. 22 is a view taken along lines 22—22 of FIG. 21.

As seen in FIGS. 21 and 22, an actuator arm 310 is mounted on housing 307 having a magnetic contact 313 thereon and extends to a magnetic sensing switch 311 mounted to control panel 147. As seen in FIG. 21, a second magnetic sensing switch 312 is disposed on panel 147 below switch 311. These switches are similar to aforementioned switches 50, such as hall effect sensors coupled via suitable electronics to panel 147 and operated therewith.

The normal position of rods 308 is shown in solid lines in FIG. 21. After strips 168 are deposited into baskets 113, 114, as heretofore described with respect to FIG. 8, the baskets 113, 114 are rotated to the FIG. 21 position also as heretofore described. When the baskets 113, 114 reach this position, motor 309 is activated to move dibber housing 307 downwardly in FIG. 21 so that the rods 308 extend into the hot oil in pot 113 inside of baskets 113, 114 as shown in dotted lines. When actuator arm 310 reaches the lower switch 312, the switch is tripped and motor 309 is reversed to return dibber housing 307 to the solid line position, the upward movement thereof being stopped when switch 311 is tripped via contact 313. Motor 309 is stopped at this point by suitable electronics coupling switches 311, 312, via panel 147, to motor 309.

When the rods 308 contact the hot oil in pot 122, the temperature differential created results in excessive bubbling. This agitation and aeration causes any clumping of the uncooked strip 168 to break up. The strips 168 are then cooked for the time previously discussed and cooked french fries are dumped out of baskets 113,114 as previously discussed.

Although the cup assembly shown in FIGS. 2 and 13 may be used, a cup drop assembly 320 (FIG. 21) may be used. This modification provides for a storage of a greater number of cups 136 which can be dropped one at a time onto belt 162, 163.

Thus, cup drop assembly 320 includes a cup drop housing 321 (see also FIGS. 22 and 23) having a bottom shelf 322, an arcuate movable front wall 323, a movable vertical rear wall 324, a vertical side wall 325 and a top wall comprised of a pair of telescoping sections, such as the mechanism used in drawer slides. Thus, upper section 328 may be fixed receiving therein, in slidable telescoping engagement, a movable lower section 327. Lower section 327 has at least one downwardly extending flange 329 providing a guide for spring 330. Spring 330 is coupled at one end to wall flange portion 331' and at the other end to a flange 328' integral with top section 328.

Wall 324 is coupled at top via bracket 402 to movable section 327 by a releasable spring biased pin assembly 400. Pin assembly 400 has a pin releasably adapted to enter a mating hole in movable section 327 to lock wall 324 thereto. A U-shaped panel 331 (see also FIG. 26A) is pivotally connected, via pivot 332, (FIG. 23) to wall 324. A knob 333 is provided on the outside of wall 324 for grasping the same. Thus, pin 401 can be released from engagement with bracket 402 and knob 333 can be grasped to pull back wall 324 and panel 331 against the bias of spring 330 and can be re-stacked cups on shelf 322 when the cups are exhausted. The wall 324 and panel 331 are then returned to the FIG. 23 position and pin 401 is locked to bracket 402.

Figure 23:
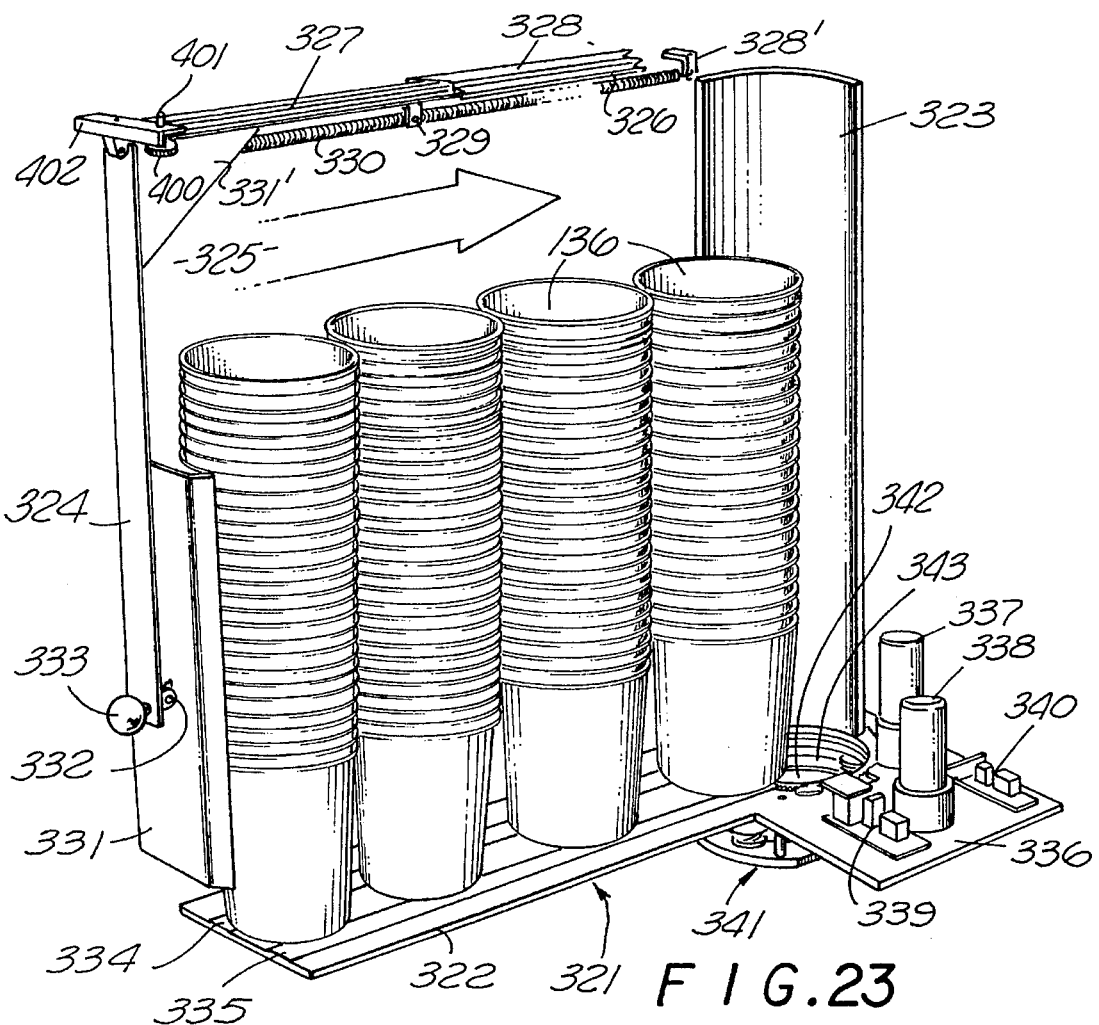
FIG. 23 is a perspective view of a portion of the apparatus of FIGS. 1 to 20 showing a further modification thereof.

A pair of spaced elongated strips 334, 335 of material, such as Teflon tape, may be provided along the top of shelf 322. Teflon is a registered trademark of Dupont and is a synthetic fluorine-containing resin used to prevent sticking. As can be seen in FIG. 23, a plurality of stacks of cups 136 are mounted on top of shelf 322 between panel 331 and curved wall 323.

Figure 25:
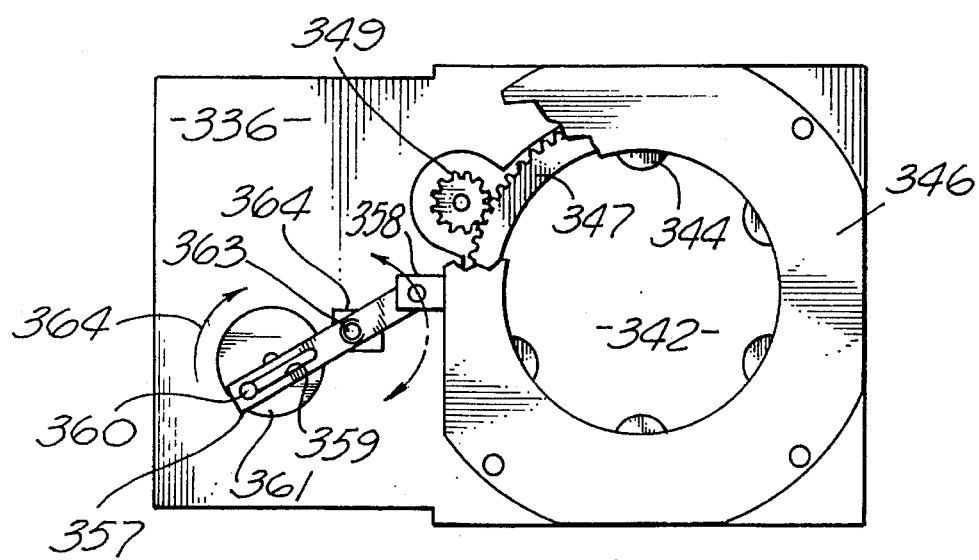
FIG. 25 is a plan view of a portion of the apparatus of FIG. 24.

A motor mounting plate 336 extends from shelf 322 and has mounted thereon a pair of motors 337, 338. Suitable electronic assemblies 339, 340 are also provided on top of plate 336. As can be seen in FIG. 23, and also in FIG. 25, a conventional cup drop assembly 341 is provided at the forward end of shelf 322, movable wall 323 curving about opening 342 therethrough.

Figure 26A:
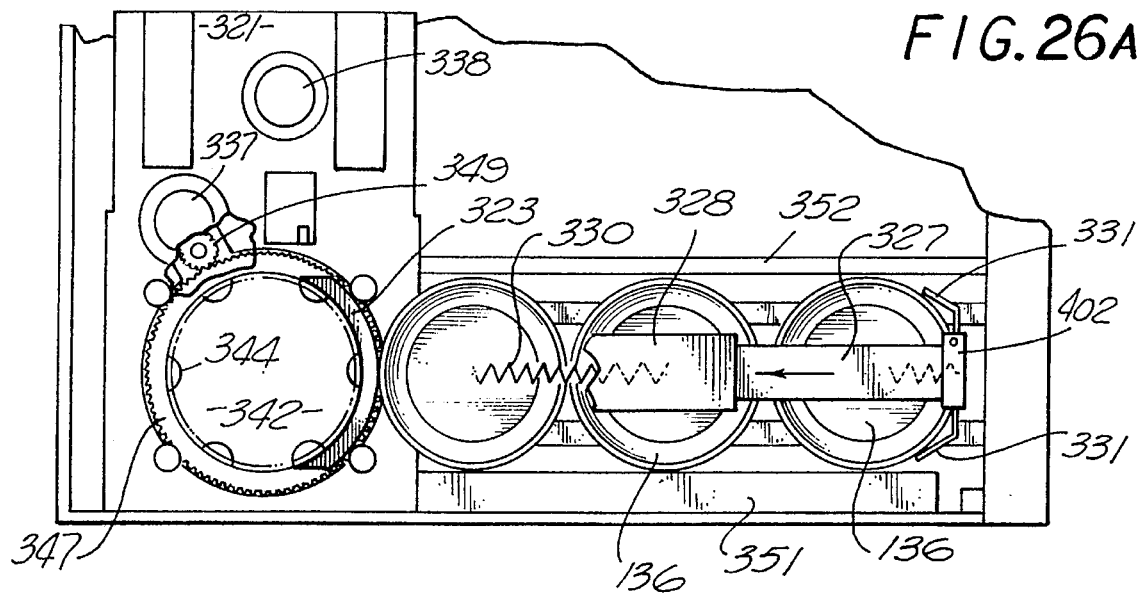
FIGS. 26A to 26C are plan views of a portion of the apparatus of FIGS. 23 to 25 illustrating the operation thereof.

As seen in FIG. 26A, when indexing motor 337 is activated to rotate drive gear 349, gear 349 rotates ring gear 347. Movable wall 323 is fixed to index gear 347 and is in the FIG. 26A blocking position. Three rows of stacked cups 136 are mounted on shelf 322. Elongated spaced guides 351, 352 are provided on each side of the stacked cups to guide the same as they move along shelf 322. Guides 351, 352 are not visible in FIG. 23.

Figure 26B:
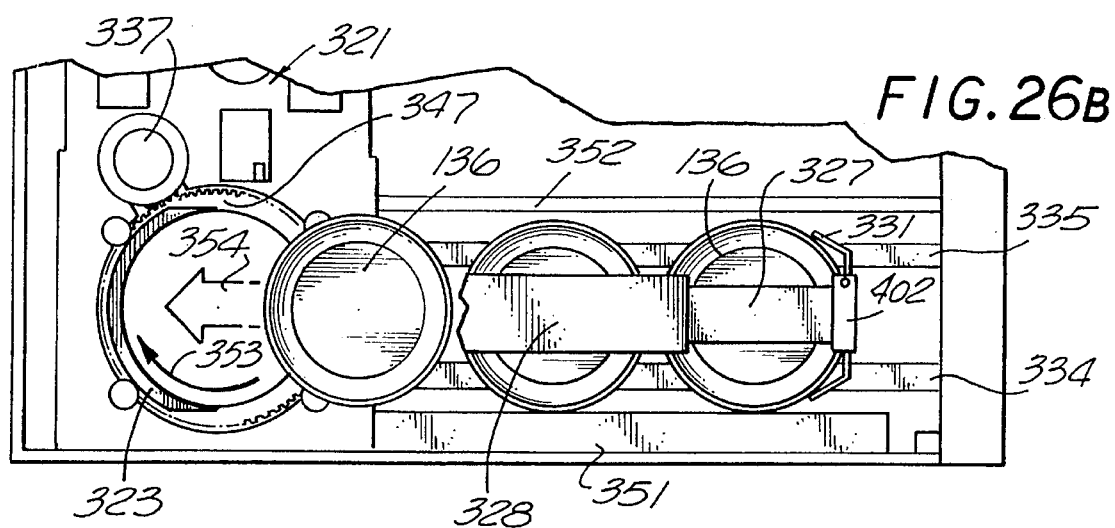
Figure 26C:
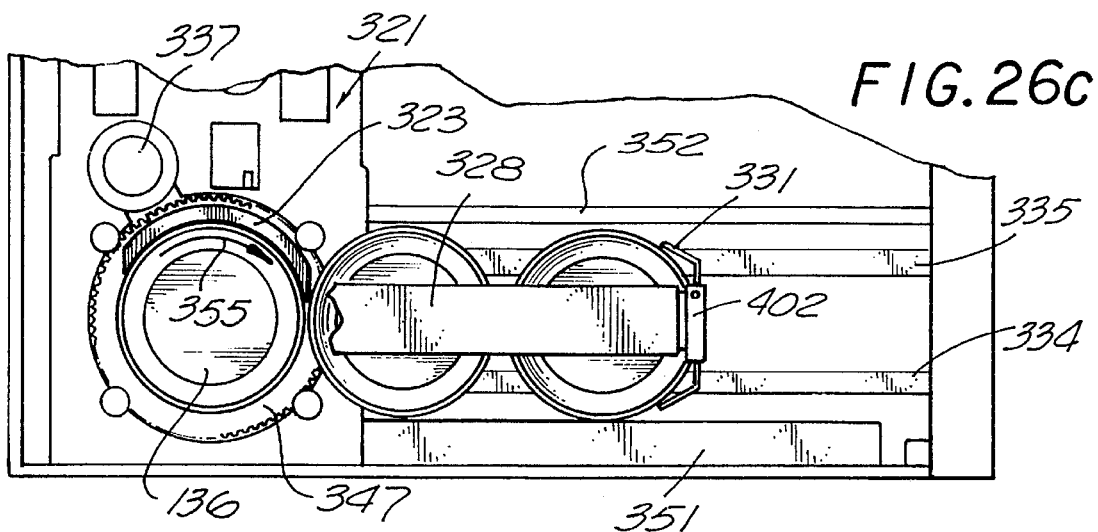

When cups are exhausted from opening 342, as will be discussed, suitable electronics associated with motor 337 senses this and rotates ring gear 347 (and blocking wall 323) in the direction of arrow 353 (FIG. 26B) thus unblocking the next row of stacked cups 136 by movement of wall 323 to the position shown in FIG. 26B. Simultaneously, spring 330, and the engagement of the rearmost stack of cups 136 by wall 331, pushes the stacked cups 136 in the direction of arrow 354. A new stack of cups 136 falls into opening 342, as seen in FIG. 26C, while gear 347 continues to rotate blocking wall 323 in the direction of arrow 355 back to the FIG. 26A position. Wall 323 thus separates the rows of stacked cups.

Figure 24:
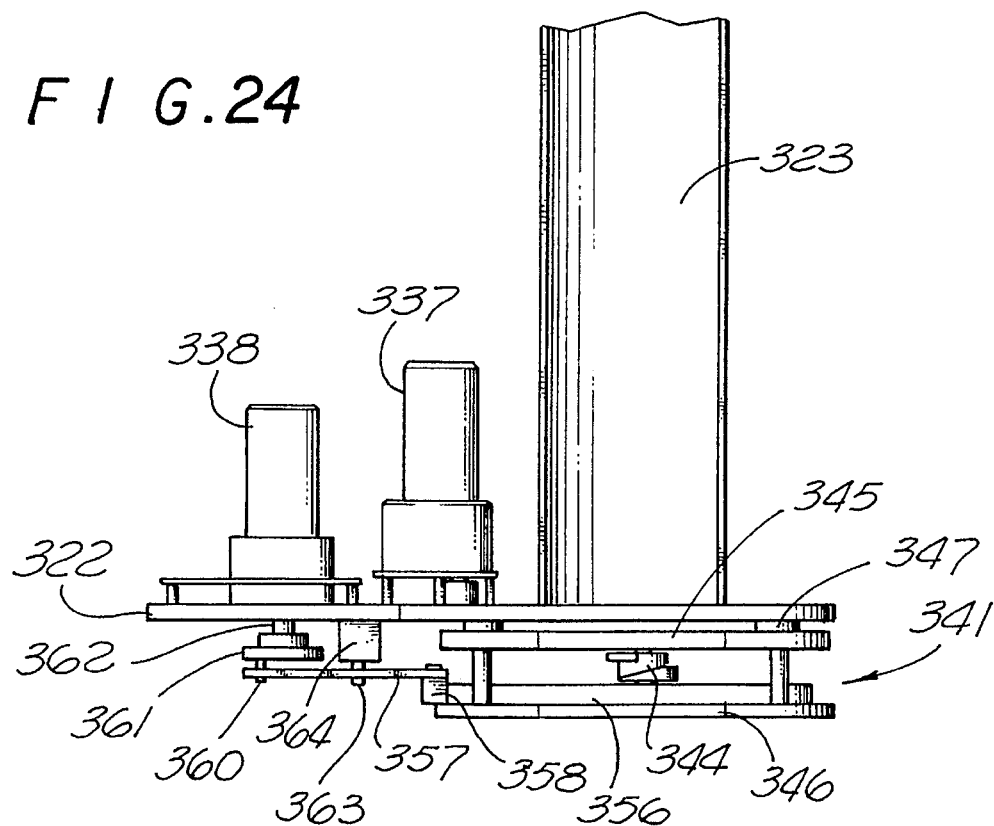
FIG. 24 is an elevational view of a portion of the apparatus of FIG. 23.

When a stack of cups 136 are disposed in opening 342, a plurality of spaced cams 344 (FIG. 26A) disposed about cup drop assembly 341 (FIG. 25) engage the lip of the bottom-most cup. Cup drop assembly 341 includes upper and lower spaced plates 345, 346 (FIG. 24) with a cam plate 356 having a plurality of rotatably mounted cams 344 mounted thereon. Cam plate 356 is rotated by a link 357 coupled thereto by connector 358. Link 357 terminates at one end in an elongated slot 359 (FIG. 25) receiving a pin 360 therein. Pin 360 is integral with a plate assembly 361 coupled via shaft 362 (FIG. 24) to motor 338. Link 357 is also connected via pin 363, fixed thereto, to a spacer 364 (FIG. 25) secured to the underside of mounting plate 336.

The foregoing mechanism is known in the trade as a cup drop assembly and a suitable cup drop assembly that may be used with the apparatus of this invention is manufactured and sold by Lisern Enterprises of Mamaroneck, N. Y. Thus, reference to such apparatus should be made for a complete understanding of the operation of cams 344.

However, as is well known in such assemblies, when the stacked cups are deposited in opening 342, when motor 338 is activated to move plate assembly 361 in the direction of arrow 364', pin 360 moves in slot 359.

Link 357 thus reciprocates bracket 358 which rotates selective ones of cams 344 to disengage from the lip of a bottommost cup, then engage the lip of the next cup, until the bottommost cup drops and the cams 344 engage the lip of the next cup. Thus, a form of screwing action takes place between the lip of the cups and the cams. Again, the foregoing is well known in the cup drop assembly and forms no part of the teachings of the invention other than in the environment set forth herein.

The aforementioned clump preventing means 301 may be easily made part of the automatic controls of the system by interposition after final extrusion of french fries as illustrated in FIG. 15b. The cup drop assembly 320 may also be easily incorporated in the system as seen in FIG. 15c at the "drop cup 136" stage.

Obviously, variations and other means of carrying out the teachings of the invention may occur to an artisan and the scope of the invention is only to be limited by the scope of the appended claims.

We claim:

1. A fry machine comprising:
    a hopper for dispensing a dehydrated food product into a mixing chamber;
    a mixing chamber having an upper end and a lower end and an opening leading therein communicating with said hopper;
    a piston chamber mounted above said mixing chamber communicating with the upper end thereof, said piston chamber having a reciprocating piston rod movably mounted therein, said piston rod having an upper end and a lower end with a piston portion at the lower end thereof, said piston rod including reciprocating means for moving said rod from a first position wherein said piston portion is disposed away from the lower end of said mixing chamber to a second position wherein said piston portion is disposed adjacent the lower end of said mixing chamber; and a die plate closing off the lower end of said mixing chamber;
    said die plate having a plurality of predetermined spaced openings extending therethrough;
    a reciprocally mounted slide below said die plate and including reciprocating means for reciprocating said slide from a first position normally closing off the spaced openings through said die plate to a second position disposed away from said spaced openings thereby allowing passage of food product therethrough;
    a water inlet having a slot opening into fluid communication with the interior of said mixing chamber between said opening leading therein and said die plate; and
    a fry pot mounted below said slide having at least one basket mounted therein.

2. In the machine of claim 1 wherein said piston portion has a lower end configured similarly to the configuration of said openings through said die plate and receivable therein.

3. In the machine of claim 1 wherein at least four baskets are disposed in said fry pot spaced about the central axis thereof.

4. In the machine of claim 1 including basket removal means associated with said basket for lifting said basket out of said fry pot.

5. In the machine of claim 4 wherein said basket removal means includes flipping means for flipping said basket over so that anything in said basket can fall by gravity out of said basket.

6. In the machine of claim 5 including a cup station mounted in said machine adjacent said fry pot for receiving therein a cooked product from said basket.

7. In the machine of claim 6 including cup delivery means associated with said cup station for selectively delivering one cup at a time to said station.

8. In the machine of claim 7 wherein said cup delivery means includes cup drop means mounted above said cup station, said cup drop means being adapted to hold a plurality of stacked cups and drop one of said stacked cups one at a time on to said cup station.

9. In the machine of claim 8 including a shelf adapted to retain said stacked cups thereon, said shelf having a cup stack holding aperture at one end and a spring biased movable wall at the other end, and first motive means for moving said spring biased movable wall against any cups stacked on said shelf and pushing the same until the forwardmost stack of cups falls into said aperture.

10. In the machine of claim 9 including a curved movable wall partially surrounding the periphery of said aperture, said first motive means coupled to said curved movable wall for selectively moving said curved movable wall to block off subsequent stacks of cups disposed on said shelf when said forwardmost stack is disposed in said aperture.

11. In the machine of claim 10 when said cup delivery means includes movable cams associated with said aperture surrounding the peripheral wall thereof adapted to engage the lip of the bottommost one of said cups when said forwardmost stack is disposed in said aperture to retain said bottommost cup within said aperture until said cams are moved out of engagement with the lip of the bottommost one of said cups.

12. In the machine of claim 11 wherein said cup delivery means includes cam moving means associated with said cams for selectively moving said cams into and out of engagement of the lip of the bottommost one of selective ones of said cups to release the same from said aperture.

13. In the machine of claim 8 wherein said cup delivery means includes indexing means for moving a plurality of separate stacks of cups disposed toward said cup station.

14. In the machine of claim 13 wherein said cup delivery means includes a shelf having a stack of cups receiving aperture at one end and a spring biased movable wall at the other end, said wall being adapted to bear against a stack of cups disposed on said shelf and push the same toward said aperture.

15. In the machine of claim 1 including air removal and filtering means associated with said fry pot for removing odors from said fry pot and filtering the same.

16. In the machine of claim 1 wherein said hopper includes a delivery tube coupled to said opening leading into said mixing chamber and including valve means associated with said delivery tube for delivering a predetermined amount of dehydrated food product from said hopper through said opening leading into said mixing chamber.

17. In the machine of claim 1 wherein the interior of said mixing chamber is rectangular in cross-section, the cross-section of said piston portion conforming to said rectangular cross-section of the interior of said mixing chamber.

18. In the machine of claim 1 wherein said fry basket is mounted on a rotatable carousel.

19. In the machine of claim 18 wherein a plurality of baskets are disposed in said fry pot spaced about the central axis thereof whereby said carousel can be rotated to selectively move said baskets one at a time below said slide.

20. In the machine of claim 19 including a shaft coupled to the center of said carousel, and motive means coupled to said shaft for rotating the same.

21. In the machine of claim 1 including alignment means associated with said slide for reciprocating the same in a substantially linear movement.

22. In the machine of claim 1 wherein the lower surface of said piston portion is coated with Teflon material.

23. In the machine of claim 1 wherein the longitudinal axis of said piston rod and the central axis of said piston portion are coaxial and vertically disposed.

24. In the machine of claim 1 wherein said first mentioned reciprocating means includes the upper end of said piston rod extending through a ball bearing assembly mounted in a pillow block, said piston chamber surrounding the upper end of said piston rod with securing means extending through the portion of said piston chamber surrounding the upper end of said piston rod and said pillow block and engaging said ball bearing assembly.

25. In the machine of claim 24 wherein the upper terminal end of said piston rod is fixedly secured to a first pulley, a second pulley spaced from said first pulley, a belt encircling both of said pulleys and driven thereby, and motor means engaging said second pulley for selectively rotating the same and thereby rotating said piston rod.

26. In the machine of claim 25 including a bushing surrounding said piston rod and threadably coupled thereto, said piston chamber having an inner wall and said bushing being keyed to the inner wall of said piston chamber.

27. In the machine of claim 1 including sensing means associated with both said piston chamber and said bushing for sensing the position of said bushing along said inner wall of said piston chamber.

28. In the machine of claim 1 wherein said fry baskets are mounted on a rotatable carousel, a plurality of spaced baskets being disposed in said fry pot spaced about the center thereof, motive means for rotating said carousel and sensing means associated with said motive means for sensing the position of said carousel and thus the location of a basket disposed in said fry pot.

29. In the machine of claim 1 wherein said spaced openings have inner walls at an angle from the vertical.

30. In the machine of claim 24 wherein said inner walls are at an angle of about 7° from the vertical.

31. In the machine of claim 1 wherein said piston portion has a lower end configured similarly to the configuration of said openings through said die plate and receivable therein.

32. In the machine of claim 31 wherein said piston portion has a plurality of spaced protrusions conforming to said spaced openings, said spaced protrusions having outer vertical peripheral walls.

33. In the machine of claim 1 including clump preventing means associated with said fry pot adapted to selectively extend into and out of said fry pot to break up clumps of uncooked food product disposed in said pot when hot oil is present in said pot.

34. In the machine of claim 33 wherein said clump preventing means includes a plurality of elongated spaced rods having lower ends movable from a first position wherein the lower ends of said rods extend into said one basket mounted in said fry pot to a second position wherein the lower ends of said rods extend out of said one basket mounted in said fry pot.

35. In the machine of claim 34 including at least a second basket mounted in said fry pot spaced from said at least one basket, said clump preventing means including a second plurality of elongated spaced rods spaced from said first mentioned plurality of elongated spaced rods having lower ends adapted to extend into said second basket.

36. In the machine of claim 34 wherein said rods are of stainless steel.

37. In the machine of claim 35 wherein said rods are of stainless steel.

* * * * *

UNITED STATES PATENT AND TRADEMARK OFFICE
CERTIFICATE OF CORRECTION

PATENT NO.   :   5,605,091
DATED        :   February 25, 1997
INVENTOR(S)  :   Jack C. Garber It is certified that error appears in the above-identified patent and that said Letters Patent is hereby corrected as shown below:

On the title page, the Assignee should read as follows:
        [73] Assignee: MXI, Inc., Los Angeles, Calif.

Signed and Sealed this

Seventeenth Day of March, 1998

*Attest:*

BRUCE LEHMAN

*Attesting Officer*       *Commissioner of Patents and Trademarks*